US011191092B2

(12) United States Patent
Hosseini et al.

(10) Patent No.: US 11,191,092 B2
(45) Date of Patent: Nov. 30, 2021

(54) TIMELINE CONSIDERATIONS FOR INTRA-UE MULTIPLEXING

(71) Applicant: QUALCOMM Incorporated, San Diego, CA (US)

(72) Inventors: Seyedkianoush Hosseini, San Diego, CA (US); Peter Gaal, San Diego, CA (US); Wei Yang, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 16/838,582

(22) Filed: Apr. 2, 2020

(65) Prior Publication Data
US 2020/0322972 A1 Oct. 8, 2020

Related U.S. Application Data

(60) Provisional application No. 62/830,343, filed on Apr. 5, 2019, provisional application No. 62/830,537, filed on Apr. 7, 2019.

(51) Int. Cl.
*H04W 4/00* (2018.01)
*H04W 72/12* (2009.01)
(52) U.S. Cl.
CPC ... *H04W 72/1257* (2013.01); *H04W 72/1289* (2013.01)
(58) Field of Classification Search
USPC ................................. 370/328, 329, 330, 331
See application file for complete search history.

(56) References Cited

U.S. PATENT DOCUMENTS

2018/0049229 A1 2/2018 Dinan et al.
2018/0324787 A1 11/2018 Yin et al.
(Continued)

FOREIGN PATENT DOCUMENTS

EP 2184883 A2 5/2010
WO WO-2018182383 A1 10/2018

OTHER PUBLICATIONS

Huawei Hisilicon: "Handling Collision between sPUCCH/ PUCCH and PUSCH/sPUSCH", 3GPP TSG RAN WG1 Meeting #87, 3GPP Draft; R1-1612828, 3rd Generation Partnership Project (3GPP), Mobile Competence Centre; 650, Route Des Lucioles; F-06921 Sophia-Antipolis Cedex; France , vol. RAN WG1, No. Reno, USA; Nov. 14, 2016-Nov. 18, 2016, Nov. 13, 2016 (Nov. 13, 2016), XP051176770, 5 Pages, Retrieved from the Internet: URL:http://www.3gpp.org/ftp/Meetings_3GPP SYNC/RAN1/Docs/ [retrieved on Nov. 13, 2016].

(Continued)

*Primary Examiner* — David Q Nguyen
(74) *Attorney, Agent, or Firm* — Timothy R. Hirzel

(57) ABSTRACT

Methods, systems, and devices for wireless communications are described. A user equipment (UE) may receive a grant scheduling a first higher priority channel that has a higher priority than each channel of multiple lower priority channels scheduled for the UE. The UE may drop a first lower priority channel of the multiple lower priority channels that at least partially overlaps in time with the first higher priority channel based on determining that the grant is received prior to a multiplexing deadline for the multiple lower priority channels. The UE may then transmit or receive a first transmission using the first higher priority channel and a second transmission using a second lower priority channel of the multiple lower priority channels based on the dropping.

30 Claims, 16 Drawing Sheets

(56) References Cited

U.S. PATENT DOCUMENTS

| | | | | |
|---|---|---|---|---|
| 2019/0239196 A1* | 8/2019 | Lee | ............... | H04W 72/14 |
| 2020/0169958 A1* | 5/2020 | Lee | ............... | H04W 52/367 |
| 2020/0187226 A1* | 6/2020 | Choi | ............... | H04W 72/0453 |
| 2020/0220693 A1* | 7/2020 | Babaei | ............... | H04L 1/1812 |
| 2020/0275484 A1* | 8/2020 | Xu | ............... | H04W 72/0453 |
| 2020/0322030 A1* | 10/2020 | Yuan | ............... | H04L 5/0091 |
| 2020/0329437 A1* | 10/2020 | MolavianJazi | ............... | H04W 52/146 |
| 2021/0067268 A1* | 3/2021 | Seo | ............... | H04L 1/0038 |

OTHER PUBLICATIONS

International Search Report and Written Opinion—PCT/US2020/026545—ISA/EPO—dated Jun. 26, 2020.
Mediatek Inc: "Multiplexing of PUCCH and Other Channels", 3GPP TSG RAN WG1 Meeting #87, 3GPP Draft; R1-1612140 Multiplexing of PUCCH and Other Channels, 3rd Generation Partnership Project (3GPP), Mobile Competence Centre ; 658, Route Des Lucioles ; F-06921 Sophia-Antipolis Cedex; France, vol. RAN WG1, No. Reno. USA; Nov. 14, 2016-Nov. 18, 2016, Nov. 5, 2016 (Nov. 5, 2016), 5 Pages, XP051198313, Retrieved from the Internet: http://www.3gpp.org/ftp/tsg_ran/WG1_RL1/TSGR187/Docs/ [retrieved on Nov. 5, 2016].

* cited by examiner

TIMELINE CONSIDERATIONS FOR INTRA-UE MULTIPLEXING

CROSS REFERENCE

The present Application for Patent claims the benefit of U.S. Provisional Patent Application No. 62/830,343 by HOSSEINI et al., entitled "TIMELINE CONSIDERATIONS FOR INTRA-UE MULTIPLEXING," filed Apr. 5, 2019, and the benefit of U.S. Provisional Patent Application No. 62/830,537 by HOSSEINI et al., entitled "TIMELINE CONSIDERATIONS FOR INTRA-UE MULTIPLEXING," filed Apr. 7, 2019, each of which is assigned to the assignee hereof, and each of which is expressly incorporated by reference herein.

BACKGROUND

The following relates generally to wireless communications, and more specifically to timeline considerations for intra-UE multiplexing.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A UE may communicate on multiple wireless channels using different types of wireless communications. In some cases, communications on two or more wireless channels may be scheduled simultaneously, resulting in a collision. Conventional techniques for resolving collisions on wireless channels can be improved.

SUMMARY

The described techniques relate to improved methods, systems, devices, and apparatuses that support timeline considerations for intra-UE multiplexing. Generally, the described techniques provide for supporting communications of different priorities. In some cases, communications between a user equipment (UE) and a base station may have an associated priority level. In some cases, the UE may be scheduled for simultaneous transmission on two or more uplink channels, but the UE may not be capable of the simultaneous transmission. The UE may instead multiplex the colliding uplink channels if they have the same priority. If the colliding channels have different priorities, the UE may drop the lower priority channel in whole or in part and transmit the higher priority channel instead.

In some cases, the UE may be scheduled for at least two low priority channels that collide in time with at least one high priority channel. The UE may support multiplexing the at least two low priority channels, but the UE may also support dropping any low priority channel which overlaps with a high priority channel. Therefore, the UE may either multiplex the colliding low priority uplink channels then drop the final, multiplexed low priority channel, or the UE may drop the low priority uplink channels that collide with the high priority uplink channel then multiplex any remaining low priority uplink channels that collide. Techniques described herein may enable a UE to determine an order for dropping and multiplexing colliding low latency channels when at least one of the colliding low latency channels also collides with a high priority uplink channel.

In some cases, the UE may determine whether to first drop or multiplex the low priority uplink channels based on when the UE receives a grant for the high priority uplink channel. The UE may determine whether to multiplex or drop first based on if the high priority grant is received before or after a multiplexing timeline deadline. For example, if the high priority grant is received after the deadline, the UE may multiplex the low priority uplink channels first, then drop the multiplexed low priority channel if it collides with the high priority uplink channel. If the UE receives the high priority grant at a time before the multiplexing timeline deadline, then the UE may drop some the low priority uplink channel(s) that collide with the high priority uplink channel prior to multiplexing. Other schemes for determining whether to multiplex first or drop first are described herein.

A method of wireless communications by a UE is described. The method may include receiving a grant scheduling a first higher priority channel that has a higher priority than each channel of a set of lower priority channels scheduled for the UE, dropping a first lower priority channel of the set of lower priority channels that at least partially overlaps in time with the first higher priority channel based on determining that the grant is received prior to a multiplexing deadline for the set of lower priority channels, and transmitting or receiving a first transmission using the first higher priority channel and a second transmission using a second lower priority channel of the set of lower priority channels based on the dropping.

An apparatus for wireless communications by a UE is described. The apparatus may include a processor, memory in electronic communication with the processor, and instructions stored in the memory. The instructions may be executable by the processor to cause the apparatus to receive a grant scheduling a first higher priority channel that has a higher priority than each channel of a set of lower priority channels scheduled for the UE, drop a first lower priority channel of the set of lower priority channels that at least partially overlaps in time with the first higher priority channel based on determining that the grant is received prior to a multiplexing deadline for the set of lower priority channels, and transmit or receiving a first transmission using the first higher priority channel and a second transmission using a second lower priority channel of the set of lower priority channels based on the dropping.

Another apparatus for wireless communications by a UE is described. The apparatus may include means for receiving a grant scheduling a first higher priority channel that has a higher priority than each channel of a set of lower priority channels scheduled for the UE, dropping a first lower priority channel of the set of lower priority channels that at least partially overlaps in time with the first higher priority channel based on determining that the grant is received prior to a multiplexing deadline for the set of lower priority channels, and transmitting or receiving a first transmission using the first higher priority channel and a second transmission using a second lower priority channel of the set of lower priority channels based on the dropping.

A non-transitory computer-readable medium storing code for wireless communications by a UE is described. The code may include instructions executable by a processor to receive a grant scheduling a first higher priority channel that has a higher priority than each channel of a set of lower priority channels scheduled for the UE, drop a first lower priority channel of the set of lower priority channels that at least partially overlaps in time with the first higher priority channel based on determining that the grant is received prior to a multiplexing deadline for the set of lower priority channels, and transmit or receiving a first transmission using the first higher priority channel and a second transmission using a second lower priority channel of the set of lower priority channels based on the dropping.

Some examples of the method, apparatuses, and non-transitory computer-readable medium described herein may further include operations, features, means, or instructions for determining the multiplexing deadline relative to a beginning of the first lower priority channel of the set of lower priority channels.

Some examples of the method, apparatuses, and non-transitory computer-readable medium described herein may further include operations, features, means, or instructions for determining the multiplexing deadline based on whether the grant schedules the first higher priority channel for uplink transmission or downlink transmission.

Some examples of the method, apparatuses, and non-transitory computer-readable medium described herein may further include operations, features, means, or instructions for determining the multiplexing deadline based on one or more processing timelines of the set of lower priority channels, one or more subcarrier spacings of the set of lower priority channels, a timing capability of the UE, or any combination thereof.

Some examples of the method, apparatuses, and non-transitory computer-readable medium described herein may further include operations, features, means, or instructions for multiplexing, based on the dropping, content of a remaining subset of the set of lower priority channels that at least partially overlap in time with one another, where the second transmission includes the multiplexed content.

Some examples of the method, apparatuses, and non-transitory computer-readable medium described herein may further include operations, features, means, or instructions for transmitting or receiving a third transmission using a third lower priority channel of the set of lower priority channels that does not overlap with any other lower priority channel of the set of lower priority channels, where the third transmission includes non-multiplexed content.

Some examples of the method, apparatuses, and non-transitory computer-readable medium described herein may further include operations, features, means, or instructions for dropping the first lower priority channel based on determining that the grant is received at least a threshold number of symbol periods prior to the multiplexing deadline.

In some examples of the method, apparatuses, and non-transitory computer-readable medium described herein, the threshold number of symbol periods is based on a transmission direction associated with the grant.

Some examples of the method, apparatuses, and non-transitory computer-readable medium described herein may further include operations, features, means, or instructions for dropping a second lower priority channel of the set of lower priority channels that at least partially overlaps in time with the first higher priority channel.

In some examples of the method, apparatuses, and non-transitory computer-readable medium described herein, determining that the grant may be received prior to the multiplexing deadline may include operations, features, means, or instructions for determining that a control channel carrying the grant ends prior to the multiplexing deadline.

In some examples of the method, apparatuses, and non-transitory computer-readable medium described herein, determining that the grant may be received prior to the multiplexing deadline may include operations, features, means, or instructions for determining that a shared data channel carrying the grant ends prior to the multiplexing deadline.

In some examples of the method, apparatuses, and non-transitory computer-readable medium described herein, transmitting or receiving the first transmission and the second transmission may include operations, features, means, or instructions for transmitting or receiving each of the first transmission and the second transmission using a single component carrier.

Some examples of the method, apparatuses, and non-transitory computer-readable medium described herein may further include operations, features, means, or instructions for determining that the first lower priority channel at least partially overlaps in time with the first higher priority channel based on setting a timing advance to a common value for a first component carrier configured for the first lower priority channel and a second component carrier configured for the first higher priority channel, the first component carrier differing from the second component carrier.

Some examples of the method, apparatuses, and non-transitory computer-readable medium described herein may further include operations, features, means, or instructions for determining a priority level of the first higher priority channel based on an indication included in the grant.

In some examples of the method, apparatuses, and non-transitory computer-readable medium described herein, the indication may be one or more of a format of scheduling downlink control information including the grant, a bit field, a radio network temporary identifier, a control resource set index, an order in which the first higher priority channel may be scheduled relative to each channel of the set of lower priority channels, or a transmission configuration indicator state corresponding to the grant.

Some examples of the method, apparatuses, and non-transitory computer-readable medium described herein may further include operations, features, means, or instructions for receiving a set of grants that respectively schedule the set of lower priority channels.

In some examples of the method, apparatuses, and non-transitory computer-readable medium described herein, the first higher priority channel may be a first control channel and the first lower priority channel may be a second control channel or a shared data channel.

In some examples of the method, apparatuses, and non-transitory computer-readable medium described herein, each of the set of lower priority channels may have a same priority level.

In some examples of the method, apparatuses, and non-transitory computer-readable medium described herein, the first higher priority channel may be a control channel or a shared data channel.

In some examples of the method, apparatuses, and non-transitory computer-readable medium described herein, the first higher priority channel and the second lower priority channel do not overlap in time.

In some examples of the method, apparatuses, and non-transitory computer-readable medium described herein, the first higher priority channel transports an ultra-reliable low latency service and the second lower priority channel transports an enhanced mobile broadband service.

A method of wireless communications by a base station is described. The method may include transmitting a grant scheduling a first higher priority channel that has a higher priority than each channel of a set of lower priority channels scheduled for a UE, dropping a first lower priority channel of the set of lower priority channels that at least partially overlaps in time with the first higher priority channel based on the grant being transmitted prior to a multiplexing deadline for the set of lower priority channels, and transmitting or receiving a first transmission using the first higher priority channel and a second transmission using a second lower priority channel of the set of lower priority channels based on the dropping.

An apparatus for wireless communications by a base station is described. The apparatus may include a processor, memory in electronic communication with the processor, and instructions stored in the memory. The instructions may be executable by the processor to cause the apparatus to transmit a grant scheduling a first higher priority channel that has a higher priority than each channel of a set of lower priority channels scheduled for a UE, drop a first lower priority channel of the set of lower priority channels that at least partially overlaps in time with the first higher priority channel based on the grant being transmitted prior to a multiplexing deadline for the set of lower priority channels, and transmit or receiving a first transmission using the first higher priority channel and a second transmission using a second lower priority channel of the set of lower priority channels based on the dropping.

Another apparatus for wireless communications by a base station is described. The apparatus may include means for transmitting a grant scheduling a first higher priority channel that has a higher priority than each channel of a set of lower priority channels scheduled for a UE, dropping a first lower priority channel of the set of lower priority channels that at least partially overlaps in time with the first higher priority channel based on the grant being transmitted prior to a multiplexing deadline for the set of lower priority channels, and transmitting or receiving a first transmission using the first higher priority channel and a second transmission using a second lower priority channel of the set of lower priority channels based on the dropping.

A non-transitory computer-readable medium storing code for wireless communications by a base station is described. The code may include instructions executable by a processor to transmit a grant scheduling a first higher priority channel that has a higher priority than each channel of a set of lower priority channels scheduled for a UE, drop a first lower priority channel of the set of lower priority channels that at least partially overlaps in time with the first higher priority channel based on the grant being transmitted prior to a multiplexing deadline for the set of lower priority channels, and transmit or receiving a first transmission using the first higher priority channel and a second transmission using a second lower priority channel of the set of lower priority channels based on the dropping.

Some examples of the method, apparatuses, and non-transitory computer-readable medium described herein may further include operations, features, means, or instructions for determining the multiplexing deadline relative to a beginning of the first lower priority channel of the set of lower priority channels.

Some examples of the method, apparatuses, and non-transitory computer-readable medium described herein may further include operations, features, means, or instructions for determining the multiplexing deadline based on whether the grant schedules the first higher priority channel for uplink transmission or downlink transmission.

Some examples of the method, apparatuses, and non-transitory computer-readable medium described herein may further include operations, features, means, or instructions for determining the multiplexing deadline based on one or more processing timelines of the set of lower priority channels, one or more subcarrier spacings of the set of lower priority channels, a timing capability of the UE, or any combination thereof.

Some examples of the method, apparatuses, and non-transitory computer-readable medium described herein may further include operations, features, means, or instructions for multiplexing, based on the dropping, content of a remaining subset of the set of lower priority channels that at least partially overlap in time with one another, where the second transmission includes the multiplexed content.

Some examples of the method, apparatuses, and non-transitory computer-readable medium described herein may further include operations, features, means, or instructions for transmitting or receiving a third transmission using a third lower priority channel of the set of lower priority channels that does not overlap with any other lower priority channel of the set of lower priority channels, where the third transmission includes non-multiplexed content.

Some examples of the method, apparatuses, and non-transitory computer-readable medium described herein may further include operations, features, means, or instructions for dropping the first lower priority channel based on the grant being transmitted at least a threshold number of symbol periods prior to the multiplexing deadline.

In some examples of the method, apparatuses, and non-transitory computer-readable medium described herein, the threshold number of symbol periods is based on a transmission direction associated with the grant.

Some examples of the method, apparatuses, and non-transitory computer-readable medium described herein may further include operations, features, means, or instructions for dropping a second lower priority channel of the set of lower priority channels that at least partially overlaps in time with the first higher priority channel.

Some examples of the method, apparatuses, and non-transitory computer-readable medium described herein may further include operations, features, means, or instructions for determining that a control channel carrying the grant ends prior to the multiplexing deadline.

Some examples of the method, apparatuses, and non-transitory computer-readable medium described herein may further include operations, features, means, or instructions for determining that a shared data channel carrying the grant ends prior to the multiplexing deadline.

In some examples of the method, apparatuses, and non-transitory computer-readable medium described herein, transmitting or receiving the first transmission and the second transmission may include operations, features, means, or instructions for transmitting or receiving each of the first transmission and the second transmission using a single component carrier.

Some examples of the method, apparatuses, and non-transitory computer-readable medium described herein may further include operations, features, means, or instructions for determining that the first lower priority channel at least partially overlaps in time with the first higher priority channel based on setting a timing advance to a common value for a first component carrier configured for the first lower priority channel and a second component carrier configured for the first higher priority channel, the first component carrier differing from the second component carrier.

Some examples of the method, apparatuses, and non-transitory computer-readable medium described herein may further include operations, features, means, or instructions for determining a priority level of the first higher priority channel based on an indication included in the grant.

In some examples of the method, apparatuses, and non-transitory computer-readable medium described herein, the indication may be one or more of a format of scheduling downlink control information including the grant, a bit field, a radio network temporary identifier, a control resource set index, an order in which the first higher priority channel may be scheduled relative to each channel of the set of lower priority channels, or a transmission configuration indicator state corresponding to the grant.

Some examples of the method, apparatuses, and non-transitory computer-readable medium described herein may further include operations, features, means, or instructions for transmitting a set of grants that respectively schedule the set of lower priority channels.

In some examples of the method, apparatuses, and non-transitory computer-readable medium described herein, the first higher priority channel may be a first control channel and the first lower priority channel may be a second control channel or a shared data channel.

In some examples of the method, apparatuses, and non-transitory computer-readable medium described herein, each of the set of lower priority channels may have a same priority level.

In some examples of the method, apparatuses, and non-transitory computer-readable medium described herein, the first higher priority channel may be a control channel or a shared data channel.

In some examples of the method, apparatuses, and non-transitory computer-readable medium described herein, the first higher priority channel and the second lower priority channel do not overlap in time.

In some examples of the method, apparatuses, and non-transitory computer-readable medium described herein, the first higher priority channel transports an ultra-reliable low latency service and the second lower priority channel transports an enhanced mobile broadband service.

DETAILED DESCRIPTION

Figure 1:
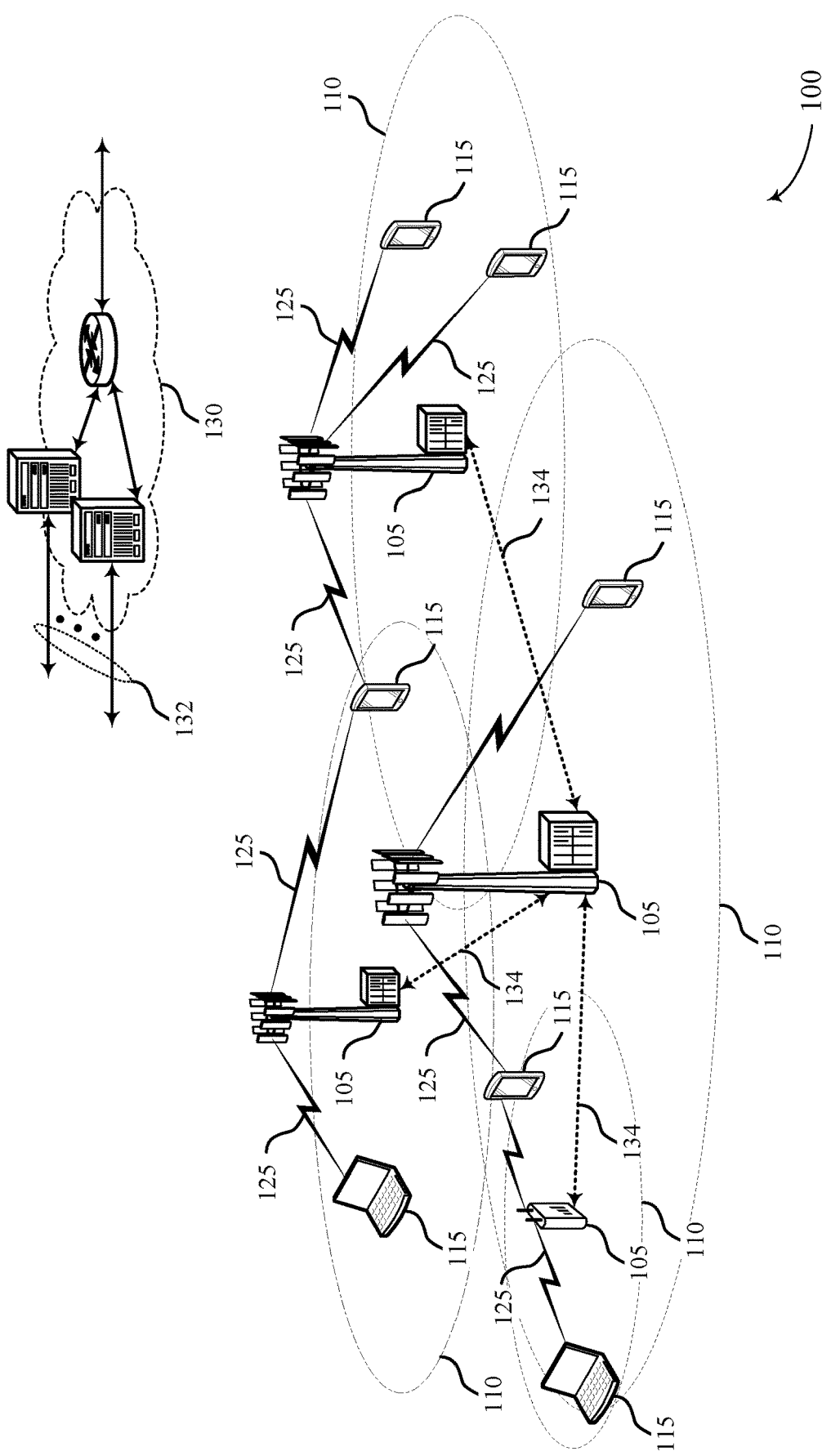
FIG. 1 illustrates an example of a system for wireless communications in accordance with aspects of the present disclosure.

In some cases, communications between a user equipment (UE) and a base station may have an associated priority level. For example, the UE may communicate on a first wireless channel using low priority signaling and communicate on a second wireless channel using high priority signaling. The priority of a wireless channel may be based on a variety of factors, such as a type of communication used on the channel, a format of downlink control information (DCI) scheduling the channel, a bit field in the DCI, a Radio Network Temporary Identifier (RNTI), a control resource set index, a scheduling time of transmission (e.g., a later-granted channel may have higher priority), and a transmission configuration indicator (TCI) state of the channel. Some example of the types of communications may include, for example, enhanced mobile broadband (eMBB) and ultra-reliable low latency communications (URLLC).

In some cases, the UE may be scheduled for simultaneous transmission on two or more channels. However, the UE may not be capable of simultaneous transmission for certain combinations of channels, as the uplink transmissions may collide and not be decodable at the receiving device. If the UE is scheduled to transmit on two or more uplink channels such that there would be a collision, the UE may implement techniques to prevent the collision instead based on a priority of the colliding channels. For example, if the colliding channels are of a same priority, the UE may multiplex the colliding channels. In some cases, the UE may multiplex colliding transmissions of the same priority if a joint transmission timeline is satisfied. If the colliding channels have different priorities, the UE may drop the lower priority channel and transmit the higher priority channel instead.

In some cases, the UE may be scheduled for at least two colliding low priority channels and at least one colliding high priority channel. The UE may support multiplexing the at least two low priority channels, but the UE may also support dropping any low priority channel which overlaps with a high priority channel. Therefore, the UE may either multiplex the colliding low priority uplink channels then drop the final, multiplexed low priority transmission, or the UE may drop the low priority uplink channels that collide with the high priority uplink channel then multiplex any remaining, colliding low priority uplink channels. Techniques described herein may enable a UE to determine an order for dropping and multiplexing colliding low latency channels when at least one of the colliding low latency channels also collides with a high priority uplink channel.

In some cases, the UE may determine whether to first drop or multiplex the low priority uplink channels based on when the UE receives a grant for the high priority uplink channel.

The UE may determine whether to multiplex or drop first based on if the high priority grant is received before or after a multiplexing timeline deadline. For example, if the high priority grant is received after the deadline, the UE may multiplex the low priority uplink channels first, then drop the multiplexed low priority channel if it collides with the high priority uplink channel. If the UE receives the high priority grant at a time before the multiplexing timeline deadline, then the UE may drop some of the low priority uplink channel(s) that collide with the high priority uplink channel prior to multiplexing. Other schemes for determining whether to multiplex first or drop first are described herein.

Aspects of the disclosure are initially described in the context of a wireless communications system. Aspects of the disclosure are further illustrated by and described with reference to apparatus diagrams, system diagrams, and flowcharts that relate to timeline considerations for intra-UE multiplexing.

FIG. 1 illustrates an example of a wireless communications system 100 in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105). In some cases, different TRPs may be associated with different types of traffic. For example, low priority channels for a first type of traffic may be associated with a first TRP, and high priority channels for a second type of traffic may be associated with a second TRP.

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may be scheduled for at least two colliding low priority channels and at least one colliding high priority channel. The UE 115 may support multiplexing the at least two low priority channels, but the UE 115 may also support dropping any low priority channel which at least partially overlaps with a high priority channel. Therefore, the UE 115 may either multiplex the colliding low priority uplink channels then drop the final, multiplexed low priority transmission, or the UE 115 may drop the low priority uplink channels that collide with the high priority uplink channel then multiplex any remaining, colliding low priority uplink channels. Techniques described herein may enable a UE 115 to determine an order for dropping and multiplexing colliding low latency channels when at least one of the colliding low latency channels also collides with a high priority uplink channel.

In some cases, the UE 115 may determine whether to first drop or multiplex the low priority uplink channels based on when the UE 115 receives a grant for the high priority uplink channel. The UE 115 may determine whether to multiplex or drop first based on if the high priority grant is received before or after a multiplexing timeline deadline. For example, if the high priority grant is received after the deadline, the UE 115 may multiplex the low priority uplink channels first, then drop the multiplexed low priority channel if it collides with the high priority uplink channel. If the UE 115 receives the high priority grant at a time before the multiplexing timeline deadline, then the UE 115 may drop some the low priority uplink channel(s) that collide with the high priority uplink channel prior to multiplexing. Other schemes for determining whether to multiplex first or drop first are described herein.

Figure 2:
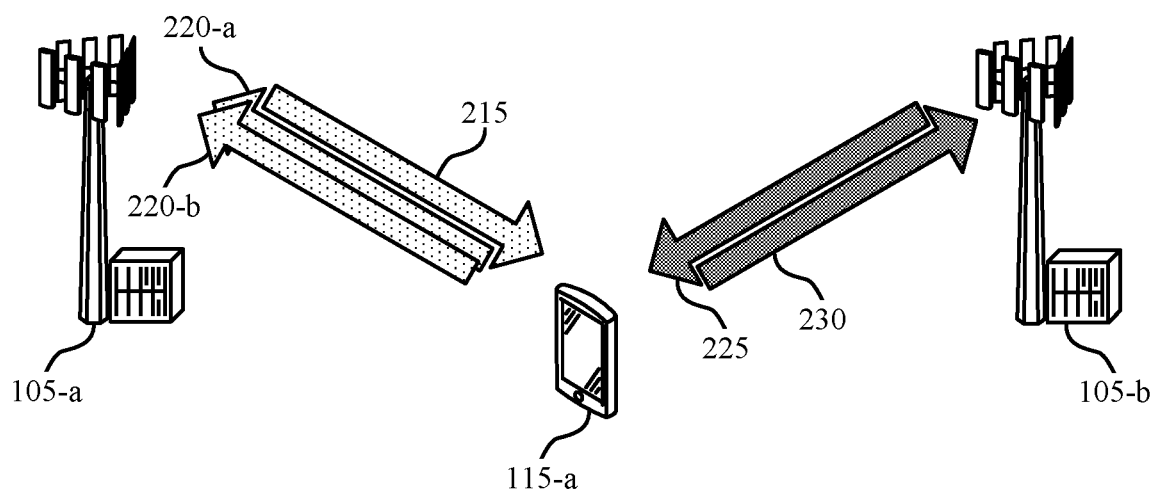
FIG. 2 illustrates an example of a wireless communications scheme in accordance with aspects of the present disclosure.
Figure 2:
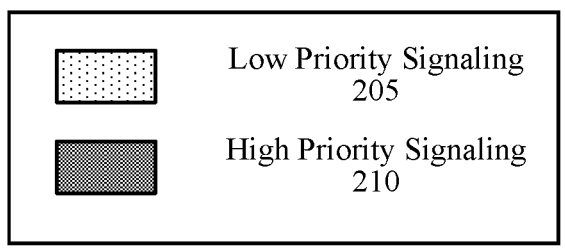

FIG. 2 illustrates an example of a wireless communications system 200 in accordance with aspects of the present disclosure. In some examples, wireless communications system 200 may implement aspects of wireless communication system 100. The wireless communications system 200 may include UE 115-a, which may be an example of a UE 115 described herein. The wireless communications system 200 may also include base station 105-a and base station 105-b, which may each be an example of a base station 105 described herein.

Communications between a UE 115 and a serving cell (e.g., provided by a base station 105) may have an associated priority level. For example, UE 115-a may communicate on a wireless channel with a serving cell using low priority signaling 205 or using high priority signaling 210. UE 115-a may receive low priority downlink transmissions on a low priority downlink channel 215 and transmit low priority uplink transmissions on at least one low priority uplink channel 220. Similarly, UE 115-a may receive high priority downlink transmissions on a high priority downlink channel 225 and transmit high priority uplink transmissions on a high priority uplink channel 230. Although not shown, in some cases a single base station 105 may provide multiple cells, where the different cells may support communications with different priorities. For example, UE 115-a may support both low priority signaling 205 and high priority signaling 210 with different cells supported by a single base station 105.

The priority of a wireless channel established between UE 115-a and a base station 105 may be based on a variety of factors. For example, priority may be based on one or more of a type of communication used on the channel, a format of downlink control information (DCI) scheduling the channel, a bit field in the DCI, a Radio Network Temporary Identifier (RNTI), a control resource set index, a scheduling time of transmission (e.g., a later-granted channel may have higher priority), and a transmission configuration indicator (TCI) state of the channel. UE 115-a may support different types of communications, such as eMBB and URLLC. In an example, eMBB communications may be an example of lower priority signaling 205 on lower priority channels, and URLLC communications may be an example of higher priority signaling 210 on higher priority channels.

In some cases, UE 115-a may be scheduled for simultaneous transmission on two or more channels. However, UE 115-a may not be capable of simultaneous transmission on certain combinations of channels. For example, UE 115-a may not support simultaneous transmission on two uplink control channels (e.g., physical uplink control channels (PUCCHs)) or simultaneous transmission on one uplink control channel (e.g., PUCCH) and one uplink shared channel (e.g., a physical uplink shared channel (PUSCH)). If UE 115-a is scheduled for simultaneous transmission of one of these channel combinations, the uplink transmissions of UE 115-a may collide and not be decodable at the receiving device (e.g., base station 105-a, base station 105-b, or both).

If UE 115-a is scheduled to transmit on two or more uplink channels such that there would be a collision, UE 115-a may implement techniques to prevent the collision instead. The techniques may be based on a priority of the colliding channels. For example, if the colliding channels are of a same priority, UE 115-a may multiplex the colliding channels. Low priority uplink channel 220-a and low priority uplink channel 220-b may be scheduled to overlap (e.g., collide) and may be of the same priority. Therefore, UE 115-a may be able to multiplex the low priority uplink channels 220 together and transmit a single transmission on one low priority uplink channel 220. In some cases, UE 115-a may multiplex colliding transmissions of the same priority if a transmission timeline based on both channels (e.g., a joint timeline) is satisfied. The joint timeline is described in more detail with reference to FIG. 3.

If the colliding channels have different priorities, UE 115-*a* may, in some cases, drop the lower priority channel, including its content, and transmit the higher priority channel instead. Or, in some cases, UE 115-*a* may multiplex some of the low priority channel's contents, such as HARQ-ACK feedback, with the higher priority channel. UE 115-*a* may then drop the lower priority channel. In some cases, multiplexing low priority channels with high priority channels may increase complexity at the UE 115. For example, the UE 115 would determine which channels should be multiplexed, how the contents would be compressed to reduce the impact on the high priority channel, how the contents would be encoded, whether the timeline for multiplexing is satisfied or not, etc. Therefore, to reduce complexity, UE 115 may, in some cases, drop any low priority channel which collides with a high priority channel.

In some cases, UE 115-*a* may be scheduled for at least two colliding low priority channels and at least one colliding high priority channel. For example, UE 115-*a* may be scheduled for low priority uplink channels 220-*a* and 220-*b* and high priority uplink channel 230. Each of these uplink channels may overlap with at least one of the other channels in time and collide. UE 115-*a* may support multiplexing the at least two low priority channels, but UE 115-*a* may also support dropping any low priority channel which overlaps with a high priority channel. Therefore, UE 115-*a* may either multiplex the colliding low priority uplink channels 220 then drop the final, multiplexed low priority transmission (e.g., should it collide with the high priority uplink channel 230), or UE 115-*a* may drop at least one of the low priority uplink channels 220 (e.g., that collide with the high priority uplink channel 230) then multiplex any remaining low priority uplink channels 220. Techniques described herein may enable a UE 115, such as UE 115-*a*, to determine whether to first multiplex colliding low priority uplink channels 220 then drop (e.g., as suitable based on any collisions) second, or to first drop any low priority uplink channels 220 that collide with the high priority uplink channel 230 then second multiplex any remaining colliding low priority channels 220 (e.g., that don't collide with the high priority uplink channel 230).

UE 115-*a* may determine whether to drop or multiplex the low priority uplink channels 220 first based on when UE 115-*a* receives a grant for the high priority uplink channel 230. UE 115-*a* may determine whether to multiplex or drop first based on if the high priority grant is received before or after a multiplexing timeline deadline. In some examples, the multiplexing timeline deadline may be based on processing timelines of the channels (e.g., N1, N2, or both), subcarrier spacing (SCS) configurations for the channels, and a timing capability of the UE. Some examples of the processing timelines of the channels and the multiplexing timeline deadline are shown in more detail with reference to FIG. 3.

If the high priority grant is received after the deadline, UE 115-*a* may multiplex the low priority uplink channels 220. UE 115-*a* may then evaluate timings of the high priority uplink channel 230 and the final (e.g., multiplexed) low priority channel and drop the multiplexed low priority channel if it collides with the high priority uplink channel 230. In some cases, if UE 115-*a* receives the high priority grant after the deadline, UE 115-*a* may have already begun to multiplex the low priority uplink channels 220.

If UE 115-*a* receives the high priority grant at a time before the multiplexing timeline deadline, then UE 115-*a* may drop some low priority uplink channels 220 before multiplexing. For example, UE 115-*a* may drop the low priority uplink channel(s) 220 that collide with the high priority uplink channel 120. UE 115-*a* may then multiplex the remaining non-colliding low priority channels. In this example, UE 115-*a* might not have multiplexed the low priority uplink channels 220 yet, or UE 115-*a* may have enough time to determine which of the low priority uplink channels 220 collide with the high priority uplink channel 230 and drop them. In this example, the order of multiplexing and dropping may be reversed based on if the high priority grant is received before or after the deadline (e.g., when the high priority channel is granted).

In some cases, the techniques described herein may lead to some advantages for a UE 115 and base station 105. For example, by determining to drop the low priority uplink channels before multiplexing, uplink throughput for the UE 115 may be increased. These techniques may support the UE 115 to meet stringent reliability and latency conditions for some types of communications (e.g., URLLC) while still providing high throughput for other types of communications. Moreover, internal components of the UE 115 and base station 105 applying the techniques may improve power utilization by dropping lower priority channels prior to multiplexing, thus saving processing power by skipping multiplexing of one or more lower priority channels.

UE 115-*a* may apply different schemes for determining whether to multiplex first or drop first. In a first example, as described above, based on receiving a high priority grant before a latest timeline deadline passes, UE 115-*a* may determine to drop one or more colliding low priority channels before multiplexing the low priority channels. In a second example, UE 115-*a* may determine the order of dropping and multiplexing based on whether an end (e.g., a last symbol period) of a high priority downlink shared channel transmission (e.g., a high priority physical downlink shared channel (PDSCH)) is before or after the timeline deadline. Additionally, or alternatively, UE 115-*a* may make the determination using different criteria based on whether the high priority grant is for a high priority uplink shared channel or a high priority downlink shared channel.

In some examples, UE 115-*a* may have different timing advances for different component carriers or different cells. For example, wireless channels provided by base station 105-*a* may have a first timing advance, and wireless channels provided by base station 105-*b* may have a second timing advance. UE 115-*a* may consider the different timing advances of the different component carriers when communicating on those component carriers. This may, in some cases, lead to inaccuracies when determining whether one or more channels collide. Therefore, when determining if there is an overlap or a collision between one or more channels to implement the techniques described herein, UE 115-*a* may instead assume each of the potentially colliding channels have no timing advance (e.g., a timing advance of 0). In some cases, UE 115-*a* may assume that the channels are symbol aligned. UE 115-*a* may then determine whether to multiplex or drop based on assuming the channels each have a timing advance of 0. This may remove potential inaccuracies introduced by the different timing advances.

One or more of the base stations 105 may also determine whether UE 115-*a* drops first or multiplexes first. In some cases, by determining which channel UE 115-*a* is dropping, the receiving base station 105 may accordingly expect to receive or not receive transmissions on that channel based on the dropping. Although generally described in the context of uplink transmissions, these techniques may also be applied for collisions of downlink transmissions.

Figure 3:
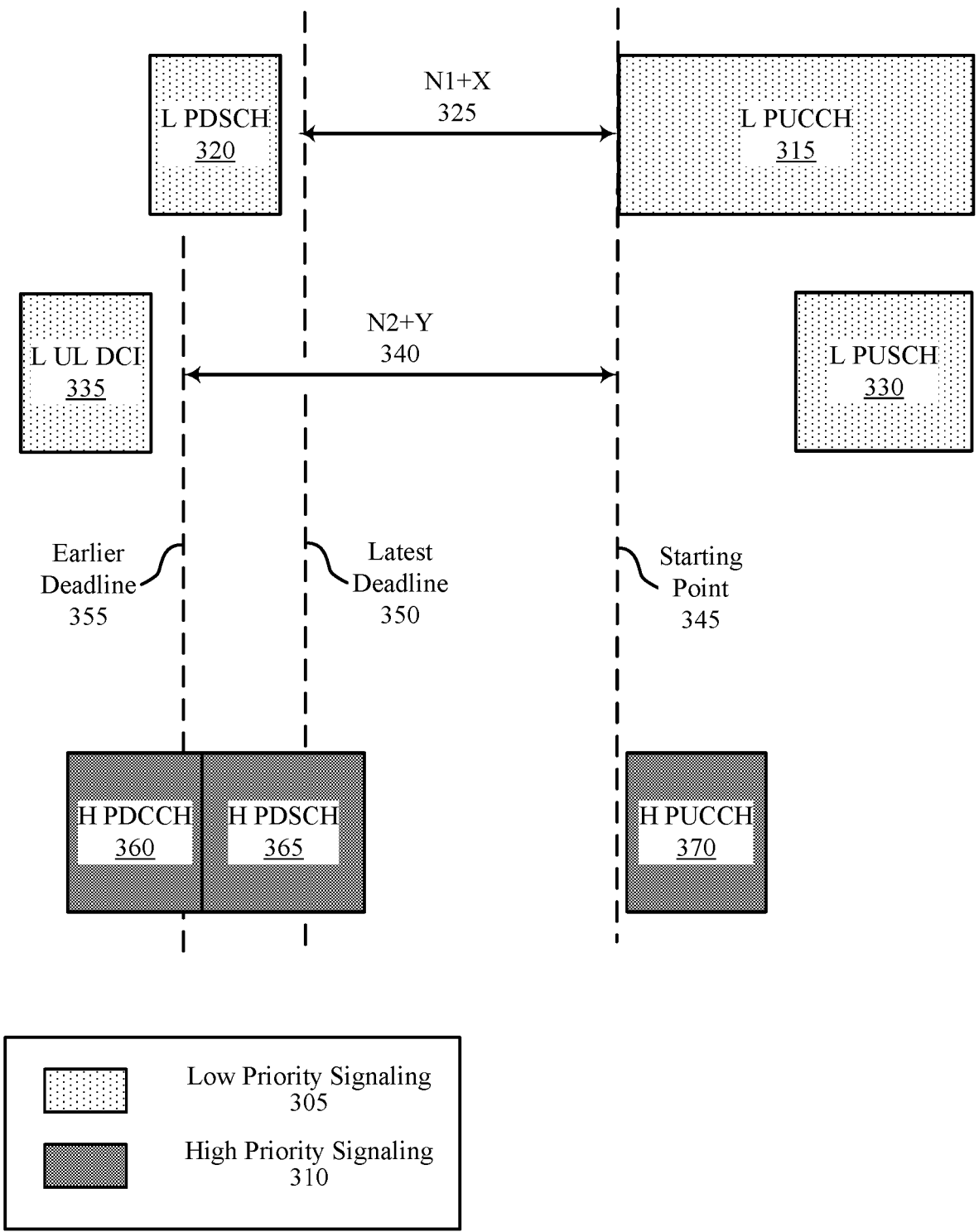
FIG. 3 illustrates an example of a collision resolution scheme in accordance with aspects of the present disclosure.

FIG. 3 illustrates an example of a collision resolution scheme 300 in accordance with aspects of the present disclosure. In some examples, collision resolution scheme 300 may implement aspects of wireless communication system 100.

As described herein, a UE 115 may be scheduled for colliding uplink channels of different priorities. For example, the UE 115 may be scheduled to transmit low priority signaling 305 one or more uplink channels simultaneously. The UE 115 may also be scheduled to transmit high priority signaling 310 on a high priority uplink channel which at least partially overlaps with one of the low priority uplink channels. The UE 115 may multiplex the colliding low priority uplink channels if the low priority channels satisfy a joint timeline. However, the UE 115 may also be configured drop any low priority channel that collides with a high priority channel. The UE 115 may therefore implement techniques to determine an order for dropping low priority channels and multiplexing them.

In an example, a low priority PUCCH 315 may overlap with a low priority PUSCH 330. In some cases, the low priority PUCCH 315 may be transmitted in response to a low priority PDSCH 320. For example, the low priority PUCCH 315 may carry feedback (e.g., ACK/NACK feedback) for the low priority PDSCH 320. The low priority PUSCH 330 may be scheduled by a low priority DCI 335. The low priority DCI 335 may include a grant indicating resources of the low priority PUSCH 330. In some cases, the UE 115 may not support simultaneous transmission on a PUCCH and a PUSCH. However, the UE 115 may be able to multiplex the low priority PUCCH 315 and the low priority PUSCH 330 if they support the joint timeline.

For the UE 115 to multiplex the low priority PUCCH 315 and the low priority PUSCH 330, the first symbol of the earliest uplink channel (e.g., to be multiplexed) among all of the overlapping channels may start no earlier than symbol N1+X after the last symbol of PDSCH. A first timing gap 325 shown here may be an example of a difference of N1+X symbols between a first symbol of the low priority PUCCH 315 (e.g., the earliest of the overlapping channels) and a last symbol of the low priority PDSCH 320. The joint timeline may also include that the first symbol of the earliest PUCCH or PUSCH among all the overlapping channels starts no earlier than a second timing gap 340 (e.g., of N2+Y symbols) after the last symbol of physical downlink control channels (PDCCHs) scheduling uplink transmissions (e.g., including HARQ-ACK feedback and PUSCH) for a slot. As shown, both the first timing gap 325 and the second timing gap 340 may be based on a starting point 345 relative to the first symbol of the earliest uplink channel. The starting point 345 of the first overlapping, low priority channel may be a reference point for the first timing gap 325 and the second timing gap 340. In some cases, the starting point 345 may also be a reference point for multiplexing timing deadlines.

If colliding channels have different priorities, the UE 115 may, in some cases, drop the lower priority channel and transmit the higher priority channel instead. As shown, the low priority PUCCH 315 may overlap with the high priority PUCCH 370. The UE 115 may thus either multiplex the overlapping low priority channels (e.g., the low priority PUCCH 315 and the low priority PUSCH 330) first then determine whether to drop low priority channels that overlap with the high priority PUCCH 370, or the UE 115 may drop low priority channels that overlap with the high priority PUCCH 370 and then multiplex any remaining overlapping low priority channels. As described herein, the UE 115 may implement techniques to determine an order for multiplexing or dropping low priority channels.

The UE 115 may determine an order for dropping or multiplexing the low priority uplink channels based on when the UE 115 receives a grant for the high priority PUCCH 370. The grant for the high priority PUCCH 370 may be transmitted in a high priority PDCCH 360. The UE 115 may determine whether to multiplex or drop first based on if the high priority grant is received before or after a multiplexing timeline deadline (e.g., a latest deadline 350 or an earlier deadline 355). In some examples, the multiplexing timeline deadline may be based on processing timelines of the channels (e.g., N1 or N2 corresponding to the timing gaps 325 and 340), SCS configurations for the channels (e.g., one or more of the high priority channel, one or more of the low priority channels, or any combination thereof), and a timing capability of the UE 115 (e.g., the duration of N1, N2, or both, may be a function of UE capabilities).

In a first option, if the high priority grant (e.g., the end of the high priority PDCCH 360 or the control resource set that carries the high priority PDCCH 360) is received before the latest deadline 350 has expired, the UE 115 may check the overlapping channels and drop some of the low priority uplink channels before multiplexing. For example, the high priority PDCCH 360 is received before the latest deadline 350. Then, the UE 115 may drop the low priority PUCCH 315, as the low priority PUCCH 315 overlaps with the high priority PUCCH 370. The UE 115 may not drop the low priority PUSCH 330 as it does not overlap with the high priority PUCCH 370. If the grant for the high priority PUCCH 370 were received after the latest deadline 350, then the UE 115 may multiplex the low priority PUCCH 315 with the low priority PUSCH 330. The UE 115 may then consider the high priority PUCCH 370 and the final low priority channel (e.g., the multiplexed uplink channel of the low priority PUCCH 315 and the low priority PUSCH 330) and then drop the final low priority channel if it overlaps with the high priority PUCCH 370. Thus, the UE 115 may drop first if the high priority grant is received before the latest deadline 350 and multiplex first if the high priority grant is received after the latest deadline 350.

In a second example, the UE 115 may consider the end of a high priority PDSCH 365 with respect to the multiplexing timeline deadlines. For example, if the last symbol of the high priority PDSCH 365 is received after the latest deadline 350, the UE 115 may multiplex the low priority PUCCH 315 and the low priority PUSCH 330. Then, the UE 115 may determine whether to drop the final, multiplexed low priority channel based on if it overlaps with the high priority PUCCH 370. Or, if the end of the high priority PDSCH 365 is before the latest deadline 350, the UE 115 may drop low priority channels which overlap with the high priority channels first, then the UE 115 may multiplex any remaining colliding low priority uplink channels.

In some cases, the deadline used by the UE 115 to determine the order of multiplexing and dropping may be based on what type of channel the high priority grant is for. For example, if the high priority grant is for a high priority PUSCH, then the multiplexing timeline deadline may be N2+Y symbol periods from a reference point (e.g., the starting point 345). Or, if the high priority grant schedules a high priority PDSCH (e.g., the high priority PDSCH 365), then the multiplexing timeline deadline may be N1+X symbol periods from the starting point 345. In other examples, other deadlines (e.g., including the earlier deadline 355) may be used to determine the order of dropping and multiplexing.

In some examples, the UE 115 may drop the low priority channel based on a gap between the grant, or the PDCCH carrying the grant, and the multiplexing deadline (e.g., an end of the PDCCH and the latest multiplexing deadline 350). For example, the UE 115 may drop before multiplexing if the grant is received at least a threshold number of symbol periods before the latest multiplexing deadline 350 (e.g., or another multiplexing deadline in other examples). The threshold number of symbol periods may be based on a type or direction of communication associated with the grant. For example, the threshold number of symbol periods may be based on if the PDCCH is for granting PDSCH or PUSCH. In an example, the threshold number of symbol periods may be based on N1, or be N1, if the grant carries a downlink assignment (e.g., PDSCH) or N2 if the grant carries an uplink assignment (e.g., PUSCH).

Figure 4:
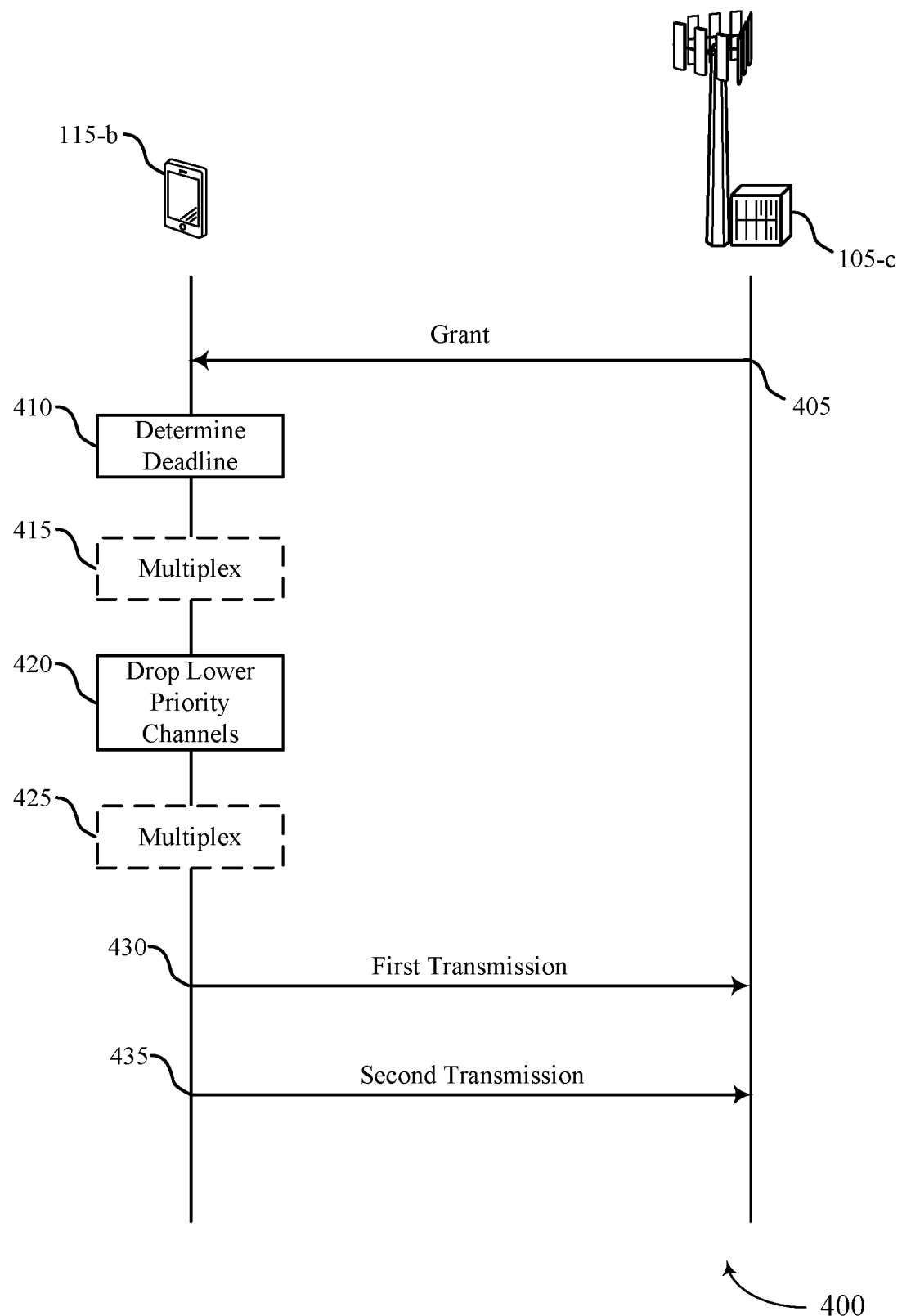
FIG. 4 illustrates an example of a process flow in accordance with aspects of the present disclosure.

FIG. 4 illustrates an example of a process flow 400 in accordance with aspects of the present disclosure. In some examples, process flow 400 may implement aspects of wireless communication system 100. Process flow 400 may include UE 115-*b* and base station 105-*c*, which may be respective examples of a UE 115 and a base station 105 described herein.

At 405, base station 105-*c* may transmit a grant scheduling a first higher priority channel to UE 115-*b* that has a higher priority than each channel of multiple lower priority channels that may be scheduled for UE 115-*b*.

In some cases, at 410, UE 115-*b* may determine a multiplexing deadline. In some examples, the multiplexing deadline may be relative to the beginning of the first lower priority channel of multiple lower priority channels. Additionally, or alternatively, the multiplexing deadline may be based on whether the grant schedules the first higher priority channel for uplink transmission or downlink transmission. In further examples, the multiplexing deadline may be based on the processing timelines of a number of lower priority channels, a set of subcarrier spacings of multiple lower priority channels, the timing capability of UE 115-*b*, or a combination thereof.

In some examples, at 415, UE 115-*b* may multiplex content of a subset of multiple lower priority channels. In some examples, the lower priority channels may partially overlap in time with one another. In some examples, the multiplexed content may be transmitted in a second transmission.

At 420, UE 115-*b* may drop the first lower priority channel of multiple lower priority channels that at least partially overlap in time with the first higher priority channel based on determining that the grant is received prior to the multiplexing deadline for multiple lower priority channels. In some examples, UE 115-*b* may drop a second lower priority channel of multiple lower priority channels. For example, the second lower priority channel may partially overlap in time with the first higher priority channel.

In some examples, at 425, UE 115-*b* may multiplex content of a remaining subset of multiple lower priority channels. In some examples, the multiplexing may be based on the dropping of multiple lower priority channels. For example, the multiple lower priority channels may partially overlap in time with one another. In some examples, the multiplexed content may be transmitted in a second transmission.

At 430, UE 115-*b* may transmit or receive a first transmission to base station 105-*c* using the first higher priority channel and, at 435, transmit or receive a second transmission using a second lower priority channel of the multiple lower priority channels based on the dropping. In some examples, the first transmission and the second transmission may use a single component carrier.

A UE and a base station may apply the techniques as described herein which may result in some advantages, such as meeting latency specifications of channels having different priority levels. Moreover, internal components of the UE and base station applying the techniques described herein may improve power utilization by dropping lower priority channels prior to multiplexing, thus saving processing power by skipping multiplexing of one or more lower priority channels.

Figure 5:
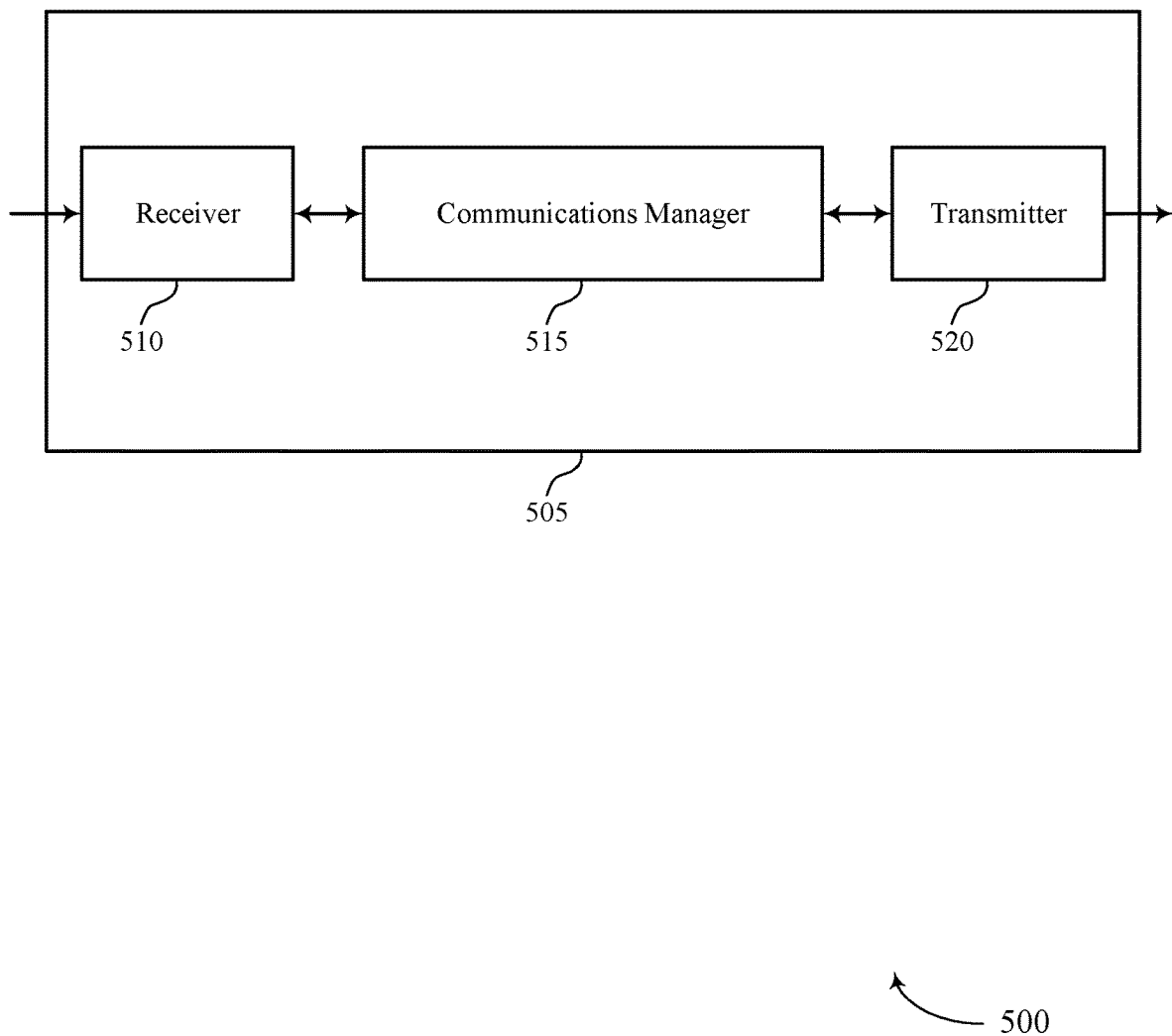
FIGS. 5 and 6 show block diagrams of devices in accordance with aspects of the present disclosure.

FIG. 5 shows a block diagram 500 of a device 505 in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to timeline considerations for intra-UE multiplexing, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a grant scheduling a first higher priority channel that has a higher priority than each channel of a set of lower priority channels scheduled for the UE, drop a first lower priority channel of the set of lower priority channels that at least partially overlaps in time with the first higher priority channel based on determining that the grant is received prior to a multiplexing deadline for the set of lower priority channels, and transmit or receiving a first transmission using the first higher priority channel and a second transmission using a second lower priority channel of the set of lower priority channels based on the dropping. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
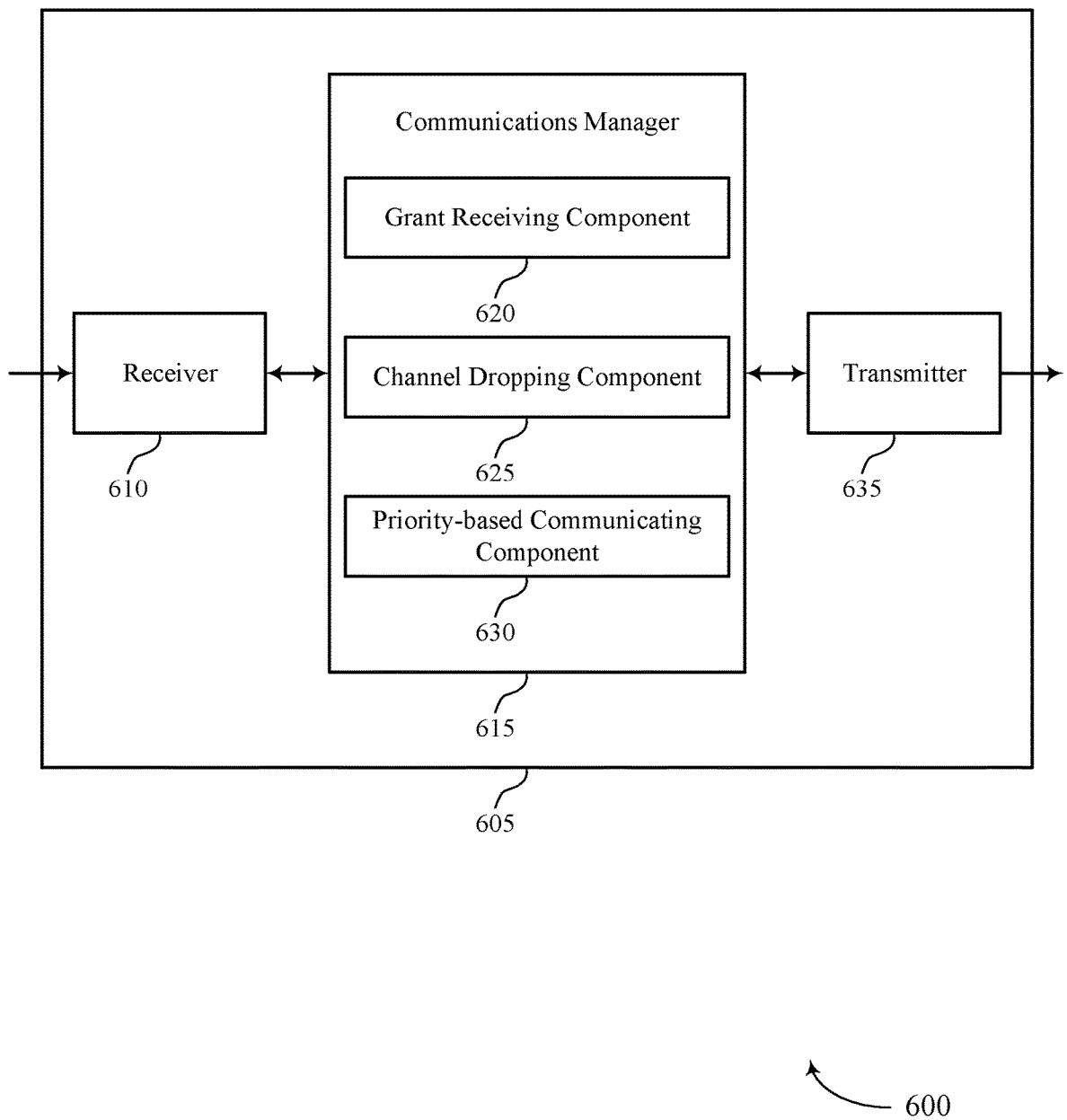

FIG. 6 shows a block diagram 600 of a device 605 that supports timeline considerations for intra-UE multiplexing in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to timeline considerations for intra-UE multiplexing, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a grant receiving component 620, a channel dropping component 625, and a priority-based communicating component 630. The communications manager 615 may be an example of aspects of the communications manager 810 described herein.

The grant receiving component 620 may receive a grant scheduling a first higher priority channel that has a higher priority than each channel of a set of lower priority channels scheduled for the UE.

The channel dropping component 625 may drop a first lower priority channel of the set of lower priority channels that at least partially overlaps in time with the first higher priority channel based on determining that the grant is received prior to a multiplexing deadline for the set of lower priority channels.

The priority-based communicating component 630 may transmit or receive a first transmission using the first higher priority channel and a second transmission using a second lower priority channel of the set of lower priority channels based on the dropping.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
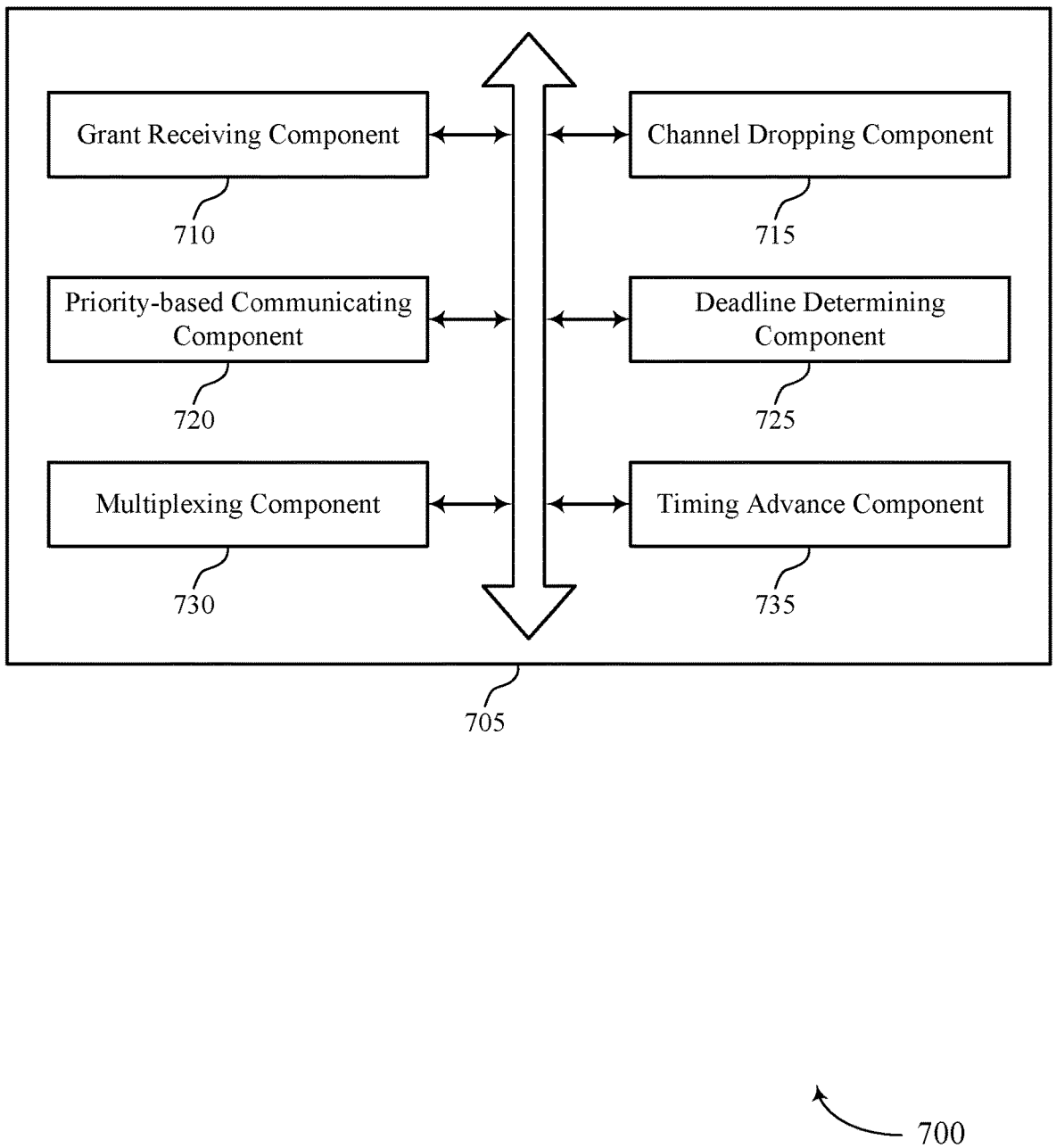
FIG. 7 shows a block diagram of a communications manager in accordance with aspects of the present disclosure.

FIG. 7 shows a block diagram 700 of a communications manager 705 that supports timeline considerations for intra-UE multiplexing in accordance with aspects of the present disclosure. The communications manager 705 may be an example of aspects of a communications manager 515, a communications manager 615, or a communications manager 810 described herein. The communications manager 705 may include a grant receiving component 710, a channel dropping component 715, a priority-based communicating component 720, a deadline determining component 725, a multiplexing component 730, and a timing advance component 735. Each of these modules may communicate, directly or indirectly, with one another (e.g., via one or more buses).

The grant receiving component 710 may receive a grant scheduling a first higher priority channel that has a higher priority than each channel of a set of lower priority channels scheduled for the UE. In some examples, the grant receiving component 710 may determine a priority level of the first higher priority channel based on an indication included in the grant.

In some examples, the grant receiving component 710 may receive a set of grants that respectively schedule the set of lower priority channels. In some cases, the indication is one or more of a format of scheduling downlink control information including the grant, a bit field, a radio network temporary identifier, a control resource set index, an order in which the first higher priority channel is scheduled relative to each channel of the set of lower priority channels, or a transmission configuration indicator state corresponding to the grant. In some cases, the first higher priority channel is a first control channel and the first lower priority channel is a second control channel or a shared data channel. In some cases, the first higher priority channel is a control channel or a shared data channel.

The channel dropping component 715 may drop a first lower priority channel of the set of lower priority channels that at least partially overlaps in time with the first higher priority channel based on determining that the grant is received prior to a multiplexing deadline for the set of lower priority channels. In some examples, the channel dropping component 715 may drop a second lower priority channel of the set of lower priority channels that at least partially overlaps in time with the first higher priority channel.

In some examples, the channel dropping component 715 may determine that a control channel carrying the grant ends prior to the multiplexing deadline. In some examples, the channel dropping component 715 may determine that a shared data channel carrying the grant ends prior to the multiplexing deadline. In some cases, each of the set of lower priority channels have a same priority level. In some cases, the first higher priority channel and the second lower priority channel do not overlap in time.

In some examples, the channel dropping component 715 may drop the first lower priority channel based on determining that the grant is received at least a threshold number of symbol periods prior to the multiplexing deadline. In some cases, the threshold number of symbol periods may be based on a transmission direction associated with the grant.

The priority-based communicating component 720 may transmit or receive a first transmission using the first higher priority channel and a second transmission using a second lower priority channel of the set of lower priority channels based on the dropping.

In some examples, the priority-based communicating component 720 may transmit or receive each of the first transmission and the second transmission using a single component carrier. In some cases, the first higher priority channel transports an ultra-reliable low latency service and the second lower priority channel transports an enhanced mobile broadband service.

The deadline determining component 725 may determine the multiplexing deadline relative to a beginning of the first lower priority channel of the set of lower priority channels. In some examples, the deadline determining component 725 may determine the multiplexing deadline based on whether the grant schedules the first higher priority channel for uplink transmission or downlink transmission. In some examples, the deadline determining component 725 may determine the multiplexing deadline based on one or more processing timelines of the set of lower priority channels, one or more subcarrier spacings of the set of lower priority channels, a timing capability of the UE, or any combination thereof.

The multiplexing component 730 may multiplex, based on the dropping, content of a remaining subset of the set of lower priority channels that at least partially overlap in time with one another, where the second transmission includes the multiplexed content. In some examples, transmitting or receiving a third transmission using a third lower priority channel of the set of lower priority channels that does not overlap with any other lower priority channel of the set of lower priority channels, where the third transmission includes non-multiplexed content.

The timing advance component 735 may determine that the first lower priority channel at least partially overlaps in time with the first higher priority channel based on setting a timing advance to a common value for a first component carrier configured for the first lower priority channel and a second component carrier configured for the first higher priority channel, the first component carrier differing from the second component carrier.

Figure 8:
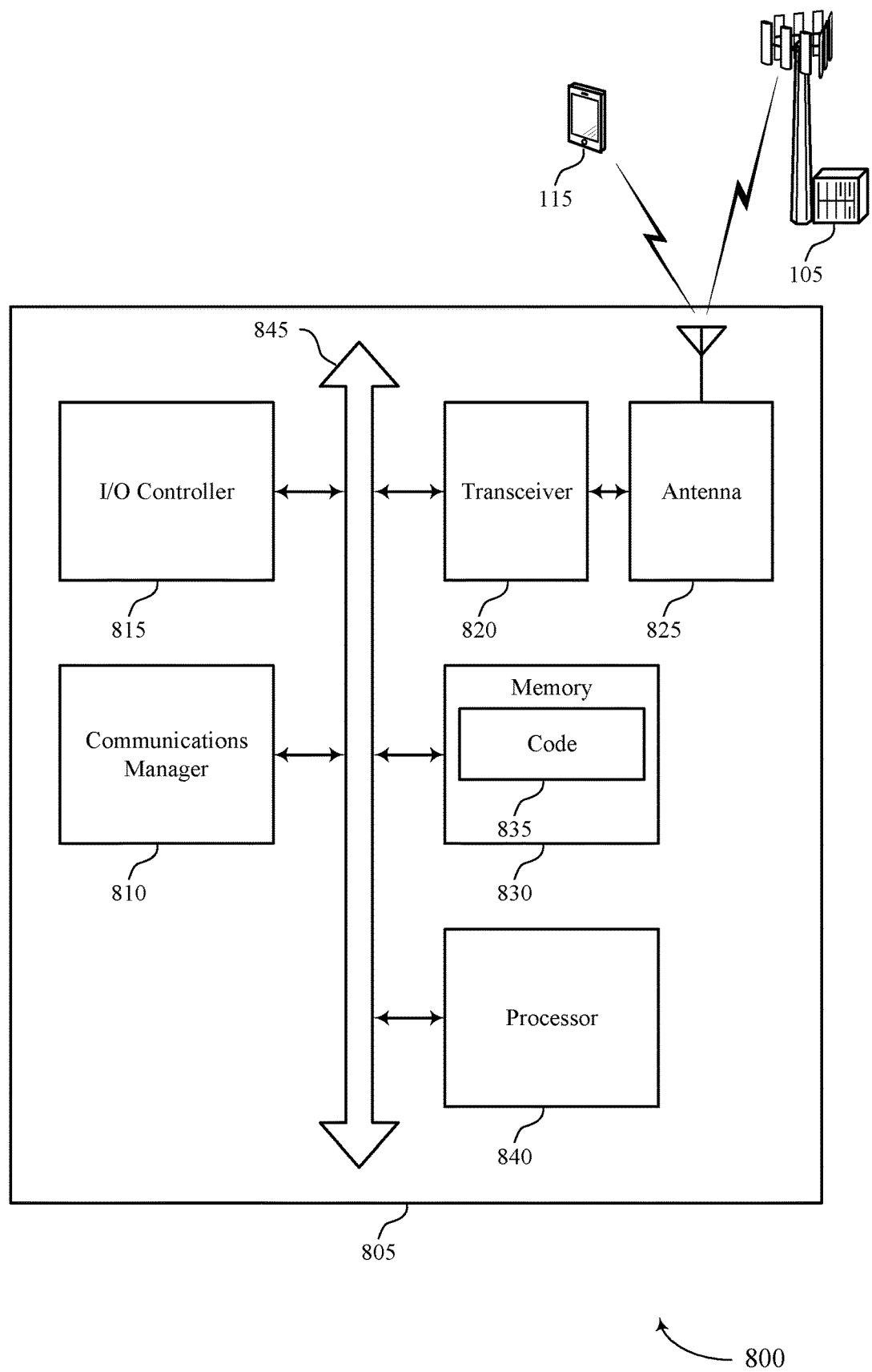
FIG. 8 shows a diagram of a system including a device in accordance with aspects of the present disclosure.

FIG. 8 shows a diagram of a system 800 including a device 805 that supports timeline considerations for intra-UE multiplexing in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a grant scheduling a first higher priority channel that has a higher priority than each channel of a set of lower priority channels scheduled for the UE, drop a first lower priority channel of the set of lower priority channels that at least partially overlaps in time with the first higher priority channel based on determining that the grant is received prior to a multiplexing deadline for the set of lower priority channels, and transmit or receiving a first transmission using the first higher priority channel and a second transmission using a second lower priority channel of the set of lower priority channels based on the dropping.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting timeline considerations for intra-UE multiplexing).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
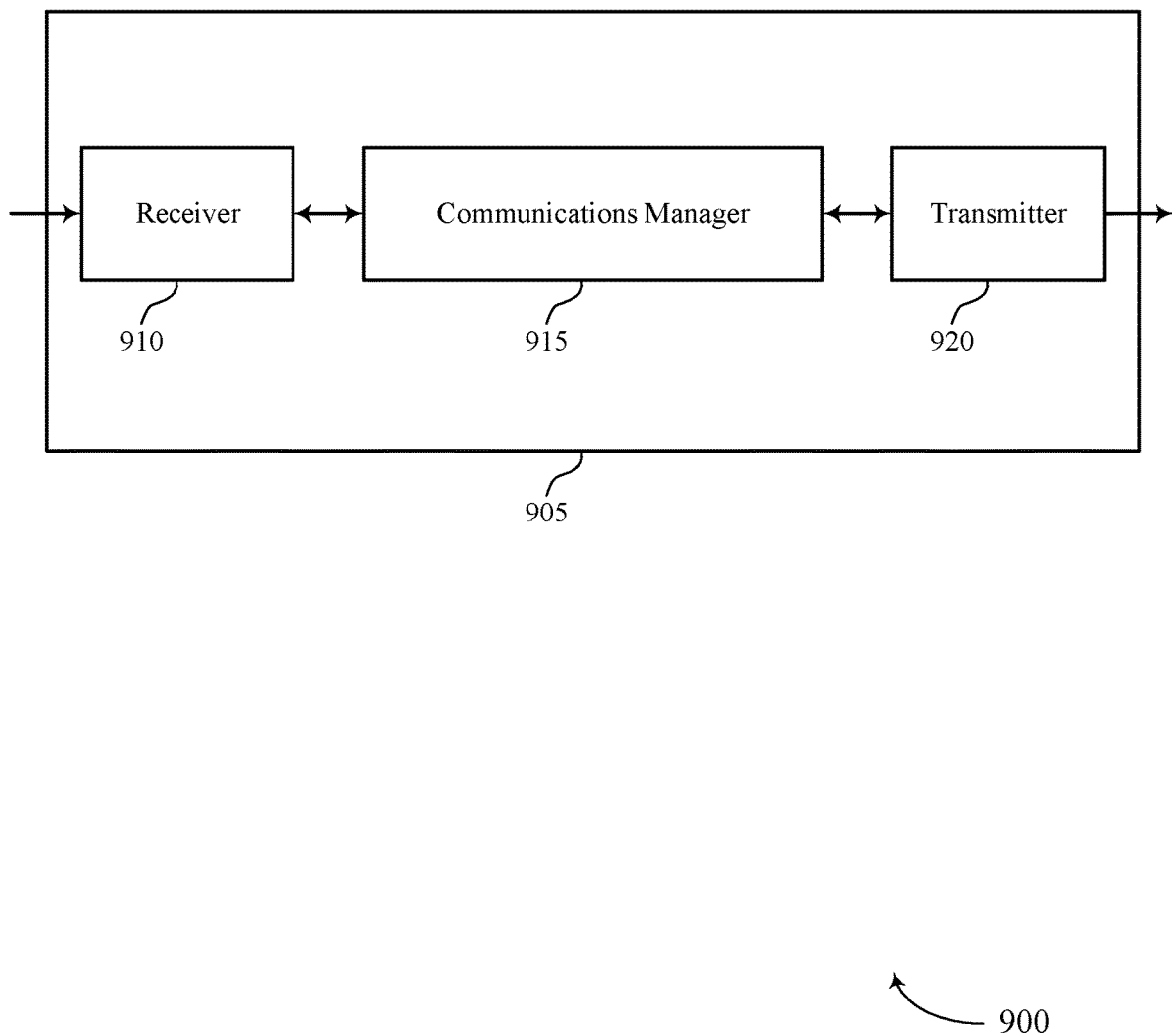
FIGS. 9 and 10 show block diagrams of devices in accordance with aspects of the present disclosure.

FIG. 9 shows a block diagram 900 of a device 905 that supports timeline considerations for intra-UE multiplexing in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to timeline considerations for intra-UE multiplexing, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit a grant scheduling a first higher priority channel that has a higher priority than each channel of a set of lower priority channels scheduled for a UE, drop a first lower priority channel of the set of lower priority channels that at least partially overlaps in time with the first higher priority channel based on the grant being transmitted prior to a multiplexing deadline for the set of lower priority channels, and transmit or receiving a first transmission using the first higher priority channel and a second transmission using a second lower priority channel of the set of lower priority channels based on the dropping. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
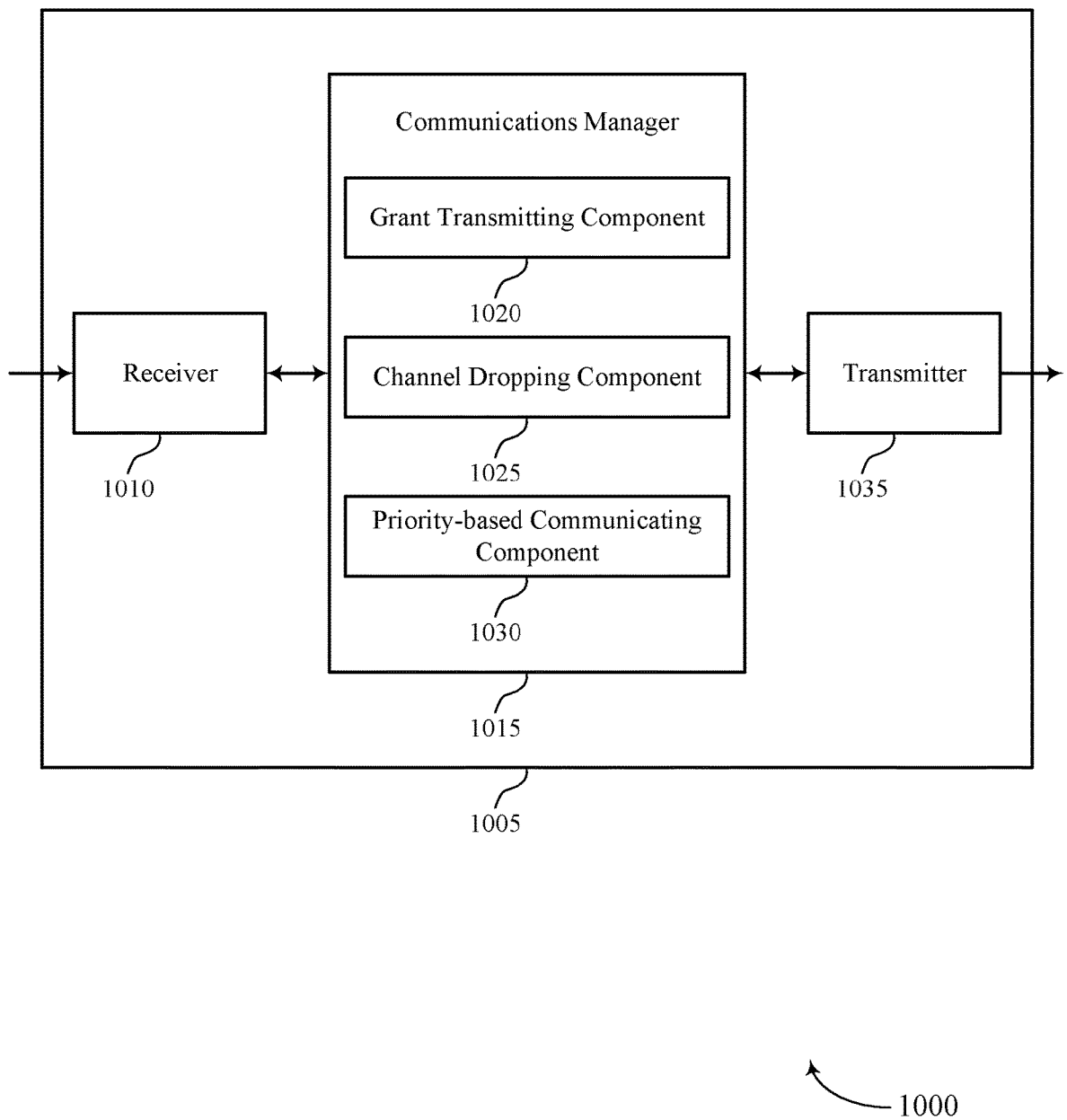

FIG. 10 shows a block diagram 1000 of a device 1005 that supports timeline considerations for intra-UE multiplexing in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to timeline considerations for intra-UE multiplexing, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a grant transmitting component 1020, a channel dropping component 1025, and a priority-based communicating component 1030. The communications manager 1015 may be an example of aspects of the communications manager 1210 described herein.

The grant transmitting component 1020 may transmit a grant scheduling a first higher priority channel that has a higher priority than each channel of a set of lower priority channels scheduled for a UE.

The channel dropping component 1025 may drop a first lower priority channel of the set of lower priority channels that at least partially overlaps in time with the first higher priority channel based on the grant being transmitted prior to a multiplexing deadline for the set of lower priority channels.

The priority-based communicating component 1030 may transmit or receive a first transmission using the first higher priority channel and a second transmission using a second lower priority channel of the set of lower priority channels based on the dropping.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
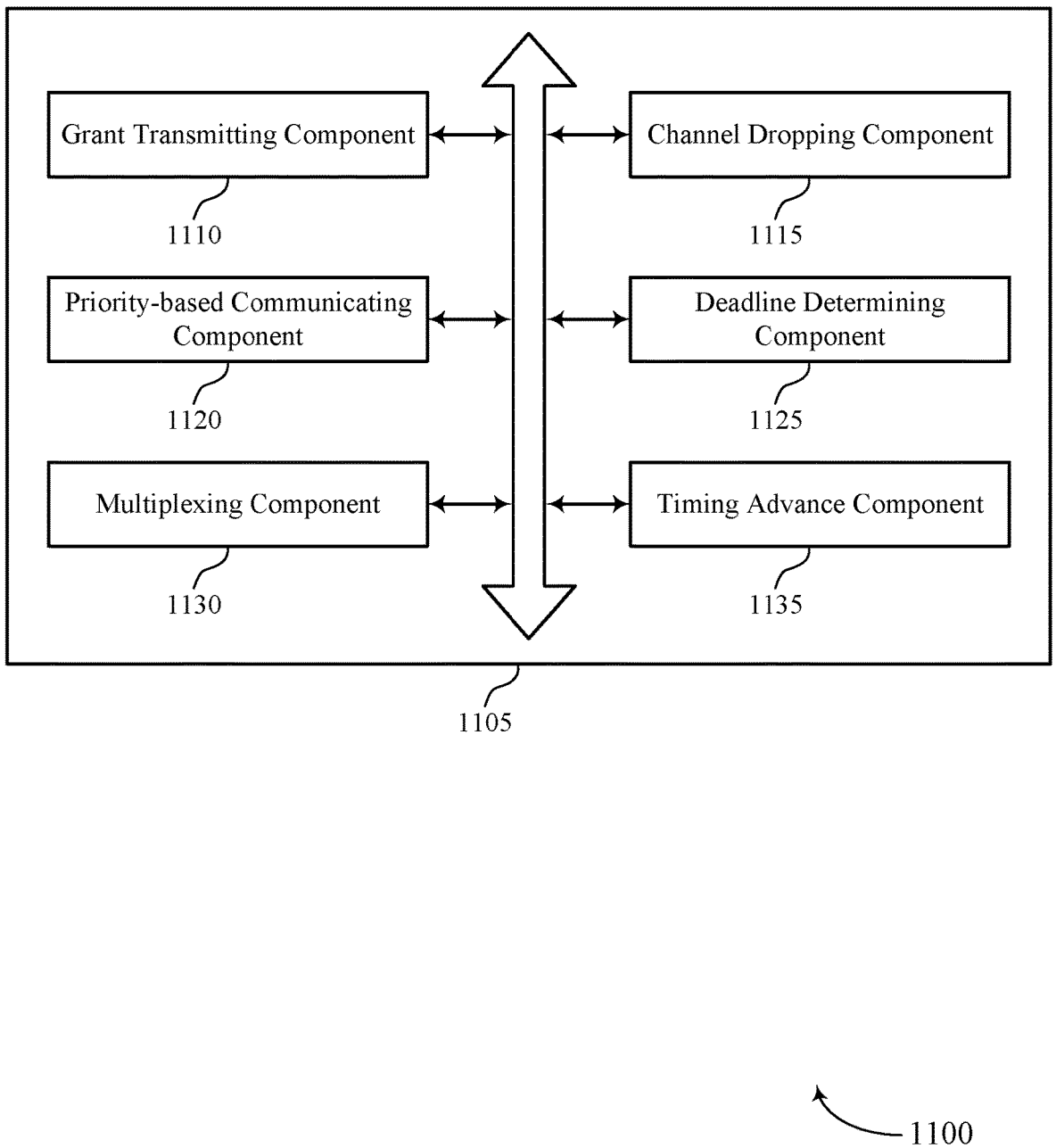
FIG. 11 shows a block diagram of a communications manager in accordance with aspects of the present disclosure.

FIG. 11 shows a block diagram 1100 of a communications manager 1105 that supports timeline considerations for intra-UE multiplexing in accordance with aspects of the present disclosure. The communications manager 1105 may be an example of aspects of a communications manager 915, a communications manager 1015, or a communications manager 1210 described herein. The communications manager 1105 may include a grant transmitting component 1110, a channel dropping component 1115, a priority-based communicating component 1120, a deadline determining component 1125, a multiplexing component 1130, and a timing advance component 1135. Each of these modules may communicate, directly or indirectly, with one another (e.g., via one or more buses).

The grant transmitting component 1110 may transmit a grant scheduling a first higher priority channel that has a higher priority than each channel of a set of lower priority channels scheduled for a UE. In some examples, the grant transmitting component 1110 may determine a priority level of the first higher priority channel based on an indication included in the grant. In some examples, the grant transmitting component 1110 may transmit a set of grants that respectively schedule the set of lower priority channels.

In some cases, the indication is one or more of a format of scheduling downlink control information including the grant, a bit field, a radio network temporary identifier, a control resource set index, an order in which the first higher priority channel is scheduled relative to each channel of the set of lower priority channels, or a transmission configuration indicator state corresponding to the grant. In some cases, the first higher priority channel is a first control channel and the first lower priority channel is a second control channel or a shared data channel.

The channel dropping component 1115 may drop a first lower priority channel of the set of lower priority channels that at least partially overlaps in time with the first higher priority channel based on the grant being transmitted prior to a multiplexing deadline for the set of lower priority channels. In some examples, the channel dropping component 1115 may drop a second lower priority channel of the set of lower priority channels that at least partially overlaps in time with the first higher priority channel.

In some examples, the channel dropping component 1115 may determine that a control channel carrying the grant ends prior to the multiplexing deadline. In some examples, the channel dropping component 1115 may determine that a shared data channel carrying the grant ends prior to the multiplexing deadline. In some cases, each of the set of lower priority channels have a same priority level. In some cases, the first higher priority channel is a control channel or a shared data channel. In some cases, the first higher priority channel and the second lower priority channel do not overlap in time.

In some examples, the channel dropping component 1115 may drop the first lower priority channel based on the grant being transmitted at least a threshold number of symbol periods prior to the multiplexing deadline. In some cases, the threshold number of symbol periods may be based on a transmission direction associated with the grant.

The priority-based communicating component 1120 may transmit or receive a first transmission using the first higher priority channel and a second transmission using a second lower priority channel of the set of lower priority channels based on the dropping. In some examples, the priority-based communicating component 1120 may transmit or receive each of the first transmission and the second transmission using a single component carrier. In some cases, the first higher priority channel transports an ultra-reliable low latency service and the second lower priority channel transports an enhanced mobile broadband service.

The deadline determining component 1125 may determine the multiplexing deadline relative to a beginning of the first lower priority channel of the set of lower priority channels. In some examples, the deadline determining component 1125 may determine the multiplexing deadline based on whether the grant schedules the first higher priority channel for uplink transmission or downlink transmission. In some examples, the deadline determining component 1125 may determine the multiplexing deadline based on one or more processing timelines of the set of lower priority channels, one or more subcarrier spacings of the set of lower priority channels, a timing capability of the UE, or any combination thereof.

The multiplexing component 1130 may multiplex, based on the dropping, content of a remaining subset of the set of lower priority channels that at least partially overlap in time with one another, where the second transmission includes the multiplexed content. In some examples, transmitting or receiving a third transmission using a third lower priority channel of the set of lower priority channels that does not overlap with any other lower priority channel of the set of lower priority channels, where the third transmission includes non-multiplexed content.

The timing advance component 1135 may determine that the first lower priority channel at least partially overlaps in time with the first higher priority channel based on setting a timing advance to a common value for a first component carrier configured for the first lower priority channel and a second component carrier configured for the first higher priority channel, the first component carrier differing from the second component carrier.

Figure 12:
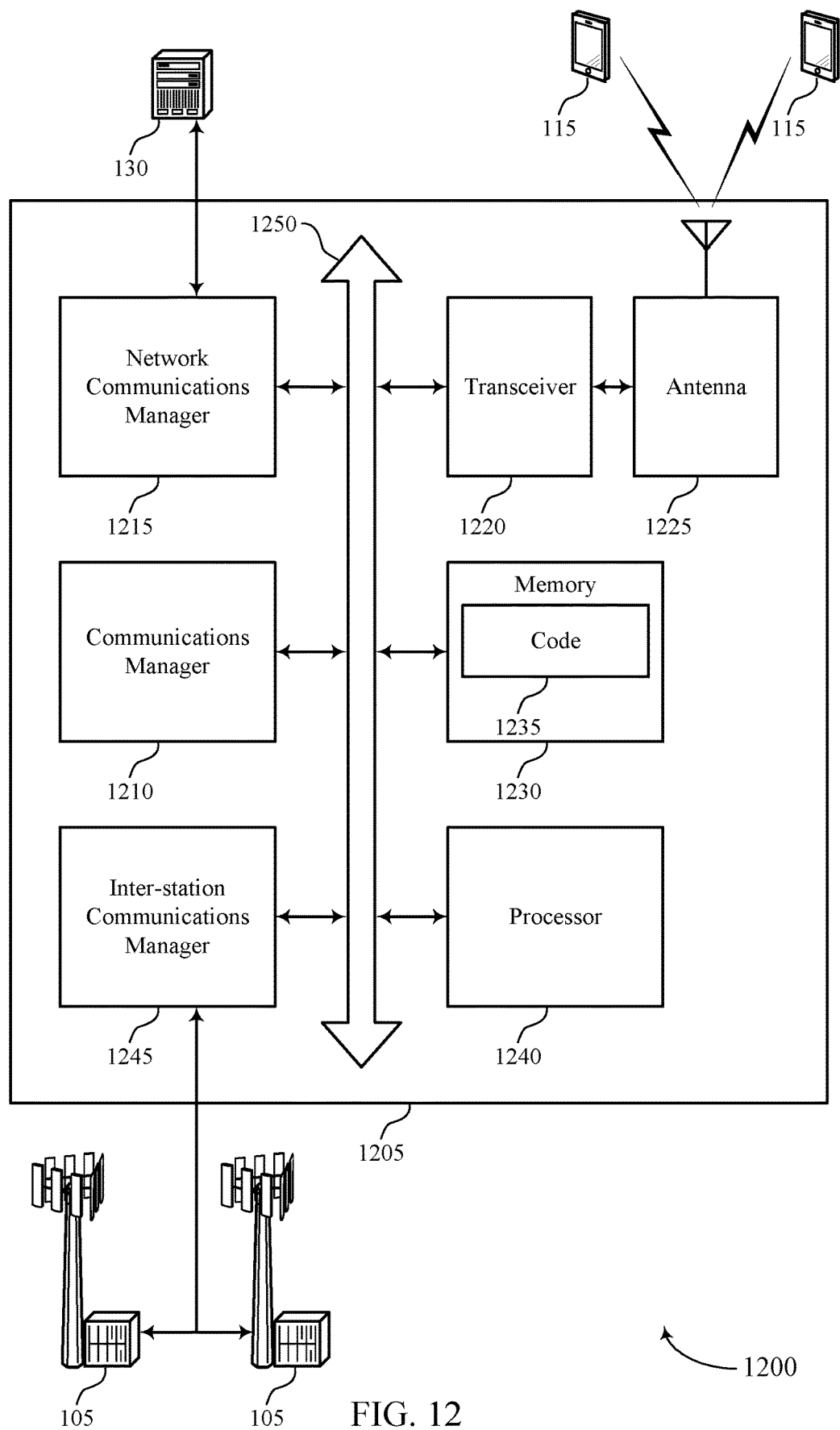
FIG. 12 shows a diagram of a system including a device in accordance with aspects of the present disclosure.

FIG. 12 shows a diagram of a system 1200 including a device 1205 that supports timeline considerations for intra-UE multiplexing in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit a grant scheduling a first higher priority channel that has a higher priority than each channel of a set of lower priority channels scheduled for a UE, drop a first lower priority channel of the set of lower priority channels that at least partially overlaps in time with the first higher priority channel based on the grant being transmitted prior to a multiplexing deadline for the set of lower priority channels, and transmit or receiving a first transmission using the first higher priority channel and a second transmission using a second lower priority channel of the set of lower priority channels based on the dropping.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting timeline considerations for intra-UE multiplexing).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
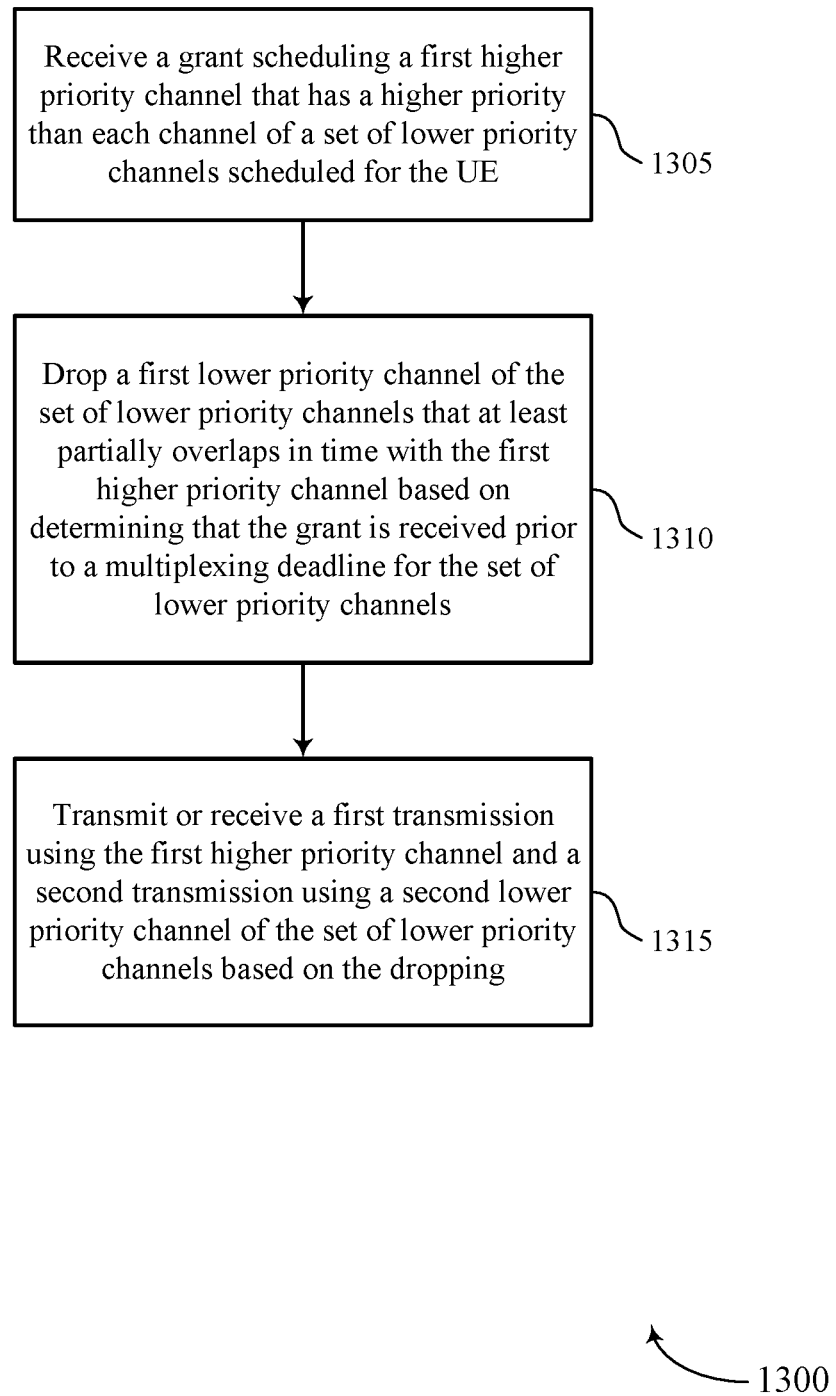
FIGS. 13 through 16 show flowcharts illustrating methods in accordance with aspects of the present disclosure.

FIG. 13 shows a flowchart illustrating a method 1300 that supports timeline considerations for intra-UE multiplexing in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive a grant scheduling a first higher priority channel that has a higher priority than each channel of a set of lower priority channels scheduled for the UE. The operations of 1305 may be performed according to the methods described herein. In some examples, aspects of the operations of 1305 may be performed by a grant receiving component as described with reference to FIGS. 5 through 8.

At 1310, the UE may drop a first lower priority channel of the set of lower priority channels that at least partially overlaps in time with the first higher priority channel based on determining that the grant is received prior to a multiplexing deadline for the set of lower priority channels. The operations of 1310 may be performed according to the methods described herein. In some examples, aspects of the operations of 1310 may be performed by a channel dropping component as described with reference to FIGS. 5 through 8.

At 1315, the UE may transmit or receive a first transmission using the first higher priority channel and a second transmission using a second lower priority channel of the set of lower priority channels based on the dropping. The operations of 1315 may be performed according to the methods described herein. In some examples, aspects of the operations of 1315 may be performed by a priority-based communicating component as described with reference to FIGS. 5 through 8.

In some cases, the techniques described herein may lead to some advantages for a UE 115 and base station 105. For example, by determining to drop the low priority uplink channels before multiplexing, uplink throughput for the UE 115 may be increased. These techniques may support the UE 115 to meet stringent reliability and latency conditions for some types of communications (e.g., URLLC) while still providing high throughput for other types of communications. Moreover, internal components of the UE 115 and base station 105 applying the techniques may improve power utilization by dropping lower priority channels prior to multiplexing, thus saving processing power by skipping multiplexing of one or more lower priority channels.

Figure 14:
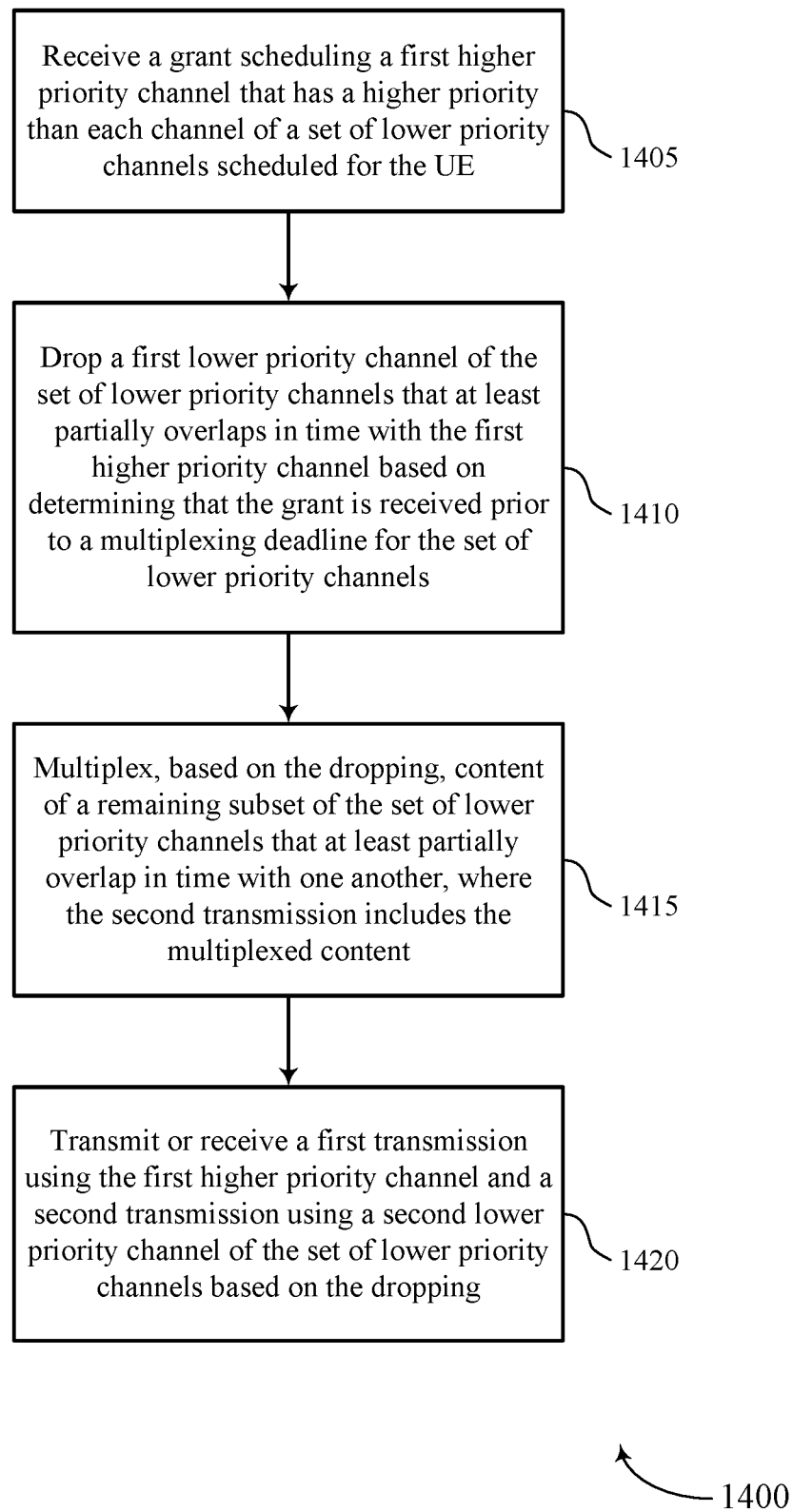

FIG. 14 shows a flowchart illustrating a method 1400 that supports timeline considerations for intra-UE multiplexing in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive a grant scheduling a first higher priority channel that has a higher priority than each channel of a set of lower priority channels scheduled for the UE. The operations of 1405 may be performed according to the methods described herein. In some examples, aspects of the operations of 1405 may be performed by a grant receiving component as described with reference to FIGS. 5 through 8.

At 1410, the UE may drop a first lower priority channel of the set of lower priority channels that at least partially overlaps in time with the first higher priority channel based on determining that the grant is received prior to a multiplexing deadline for the set of lower priority channels. The operations of 1410 may be performed according to the methods described herein. In some examples, aspects of the operations of 1410 may be performed by a channel dropping component as described with reference to FIGS. 5 through 8.

At 1415, the UE may multiplex, based on the dropping, content of a remaining subset of the set of lower priority channels that at least partially overlap in time with one another, where the second transmission includes the multiplexed content. The operations of 1415 may be performed according to the methods described herein. In some examples, aspects of the operations of 1415 may be performed by a multiplexing component as described with reference to FIGS. 5 through 8.

At 1420, the UE may transmit or receive a first transmission using the first higher priority channel and a second transmission using a second lower priority channel of the set of lower priority channels based on the dropping. The operations of 1420 may be performed according to the methods described herein. In some examples, aspects of the operations of 1420 may be performed by a priority-based communicating component as described with reference to FIGS. 5 through 8.

Figure 15:
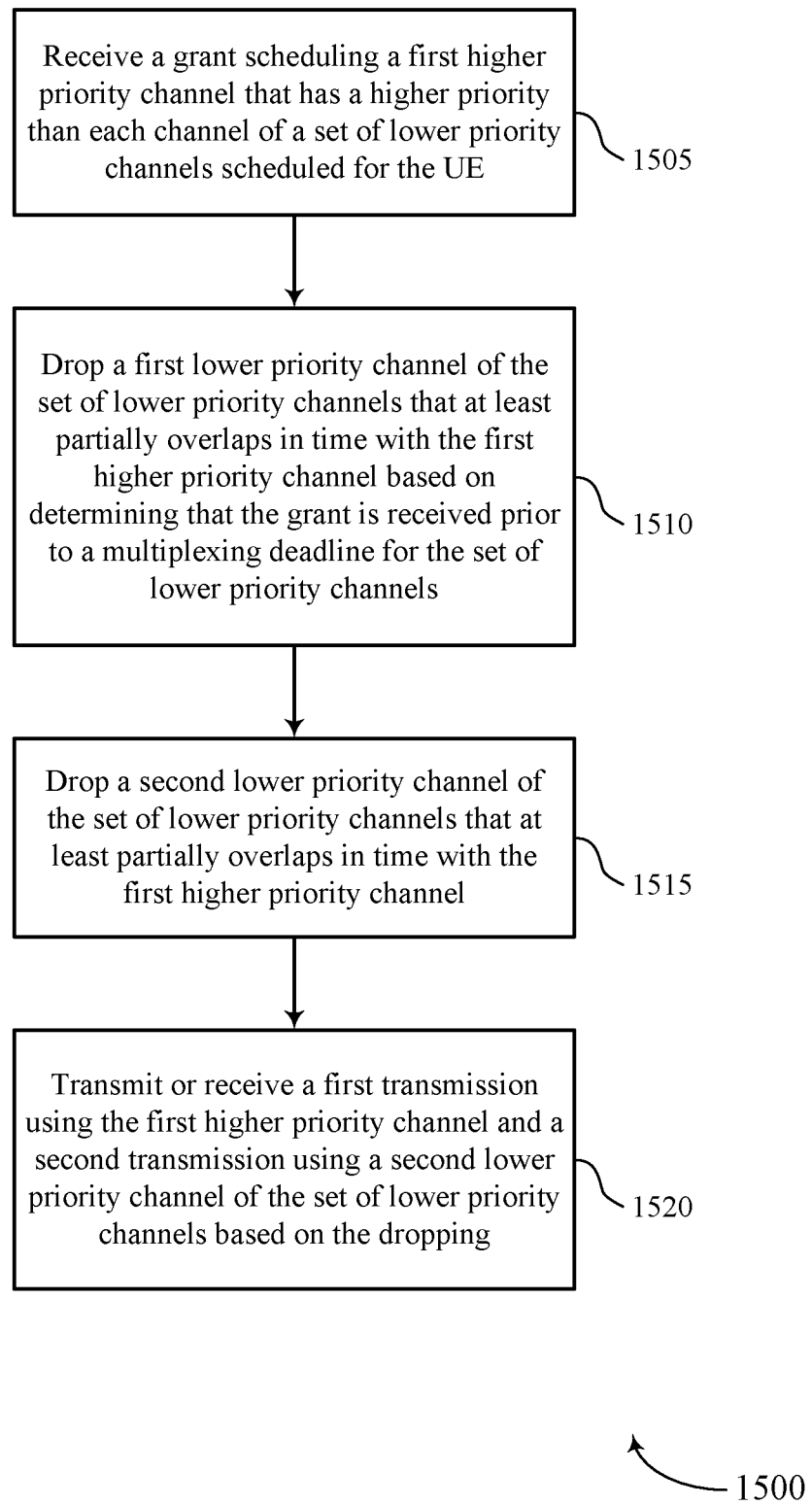

FIG. 15 shows a flowchart illustrating a method 1500 that supports timeline considerations for intra-UE multiplexing in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive a grant scheduling a first higher priority channel that has a higher priority than each channel of a set of lower priority channels scheduled for the UE. The operations of 1505 may be performed according to the methods described herein. In some examples, aspects of the operations of 1505 may be performed by a grant receiving component as described with reference to FIGS. 5 through 8.

At 1510, the UE may drop a first lower priority channel of the set of lower priority channels that at least partially overlaps in time with the first higher priority channel based on determining that the grant is received prior to a multiplexing deadline for the set of lower priority channels. The operations of 1510 may be performed according to the methods described herein. In some examples, aspects of the operations of 1510 may be performed by a channel dropping component as described with reference to FIGS. 5 through 8.

At 1515, the UE may drop a second lower priority channel of the set of lower priority channels that at least partially overlaps in time with the first higher priority channel. The operations of 1515 may be performed according to the methods described herein. In some examples, aspects of the operations of 1515 may be performed by a channel dropping component as described with reference to FIGS. 5 through 8.

At 1520, the UE may transmit or receive a first transmission using the first higher priority channel and a second transmission using a second lower priority channel of the set of lower priority channels based on the dropping. The operations of 1520 may be performed according to the methods described herein. In some examples, aspects of the operations of 1520 may be performed by a priority-based communicating component as described with reference to FIGS. 5 through 8.

Figure 16:
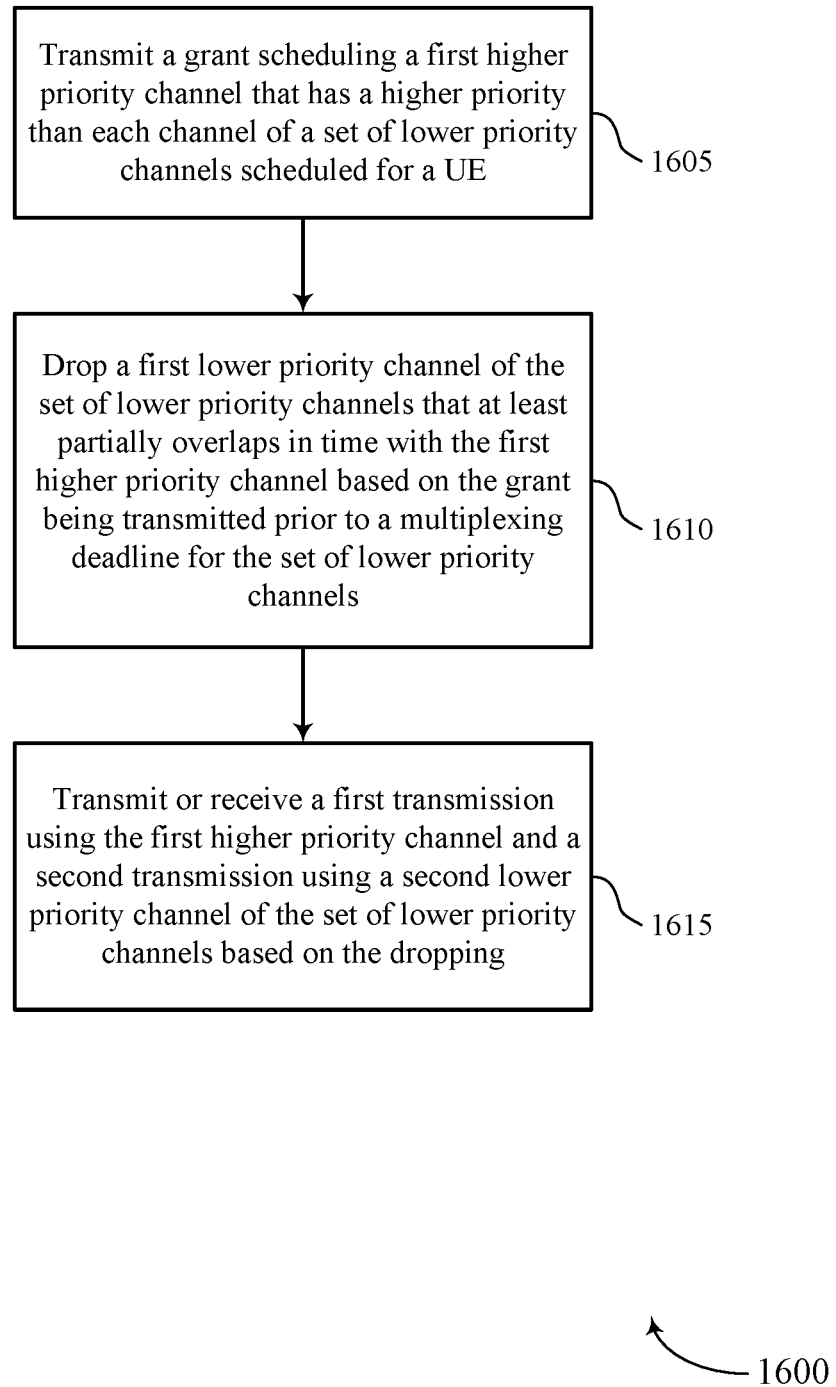

FIG. 16 shows a flowchart illustrating a method 1600 that supports timeline considerations for intra-UE multiplexing in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may transmit a grant scheduling a first higher priority channel that has a higher priority than each channel of a set of lower priority channels scheduled for a UE. The operations of 1605 may be performed according to the methods described herein. In some examples, aspects of the operations of 1605 may be performed by a grant transmitting component as described with reference to FIGS. 9 through 12.

At 1610, the base station may drop a first lower priority channel of the set of lower priority channels that at least partially overlaps in time with the first higher priority channel based on the grant being transmitted prior to a multiplexing deadline for the set of lower priority channels. The operations of 1610 may be performed according to the methods described herein. In some examples, aspects of the operations of 1610 may be performed by a channel dropping component as described with reference to FIGS. 9 through 12.

At 1615, the base station may transmit or receive a first transmission using the first higher priority channel and a second transmission using a second lower priority channel of the set of lower priority channels based on the dropping. The operations of 1615 may be performed according to the methods described herein. In some examples, aspects of the operations of 1615 may be performed by a priority-based communicating component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment (UE), comprising:
   receiving a grant scheduling a first higher priority channel that has a higher priority than each channel of a plurality of lower priority channels scheduled for the UE;
   dropping a first lower priority channel of the plurality of lower priority channels that at least partially overlaps in time with the first higher priority channel based at least in part on determining that the grant is received prior to a multiplexing deadline for the plurality of lower priority channels; and
   transmitting or receiving a first transmission using the first higher priority channel and a second transmission using a second lower priority channel of the plurality of lower priority channels based at least in part on the dropping.

2. The method of claim 1, further comprising:
   determining the multiplexing deadline relative to a beginning of the first lower priority channel of the plurality of lower priority channels.

3. The method of claim 1, further comprising:
determining the multiplexing deadline based at least in part on whether the grant schedules the first higher priority channel for uplink transmission or downlink transmission.

4. The method of claim 1, further comprising:
determining the multiplexing deadline based at least in part on one or more processing timelines of the plurality of lower priority channels, one or more subcarrier spacings of the plurality of lower priority channels, a timing capability of the UE, or any combination thereof.

5. The method of claim 1, wherein:
multiplexing, based at least in part on the dropping, content of a remaining subset of the plurality of lower priority channels that at least partially overlap in time with one another, wherein the second transmission comprises the multiplexed content.

6. The method of claim 5, further comprising:
transmitting or receiving a third transmission using a third lower priority channel of the plurality of lower priority channels that does not overlap with any other lower priority channel of the plurality of lower priority channels, wherein the third transmission comprises non-multiplexed content.

7. The method of claim 1, wherein the dropping comprises:
dropping the first lower priority channel based at least in part on determining that the grant is received at least a threshold number of symbol periods prior to the multiplexing deadline.

8. The method of claim 7, wherein the threshold number of symbol periods is based at least in part on a transmission direction associated with the grant.

9. The method of claim 1, further comprising:
dropping a second lower priority channel of the plurality of lower priority channels that at least partially overlaps in time with the first higher priority channel.

10. The method of claim 1, wherein determining that the grant is received prior to the multiplexing deadline comprises:
determining that a control channel carrying the grant or a shared data channel carrying the grant ends prior to the multiplexing deadline.

11. The method of claim 1, wherein transmitting or receiving the first transmission and the second transmission comprises:
transmitting or receiving each of the first transmission and the second transmission using a single component carrier.

12. The method of claim 1, further comprising:
determining that the first lower priority channel at least partially overlaps in time with the first higher priority channel based at least in part on setting a timing advance to a common value for a first component carrier configured for the first lower priority channel and a second component carrier configured for the first higher priority channel, the first component carrier differing from the second component carrier.

13. The method of claim 1, further comprising:
determining a priority level of the first higher priority channel based at least in part on an indication included in the grant.

14. The method of claim 13, wherein the indication is one or more of a format of scheduling downlink control information comprising the grant, a bit field, a radio network temporary identifier, a control resource set index, an order in which the first higher priority channel is scheduled relative to each channel of the plurality of lower priority channels, or a transmission configuration indicator state corresponding to the grant.

15. The method of claim 1, further comprising:
receiving a plurality of grants that respectively schedule the plurality of lower priority channels.

16. The method of claim 1, wherein the first higher priority channel is a first control channel and the first lower priority channel is a second control channel or a shared data channel.

17. The method of claim 1, wherein the first higher priority channel is a control channel or a shared data channel.

18. The method of claim 1, wherein the first higher priority channel transports an ultra-reliable low latency service and the second lower priority channel transports an enhanced mobile broadband service.

19. A method for wireless communications by a base station, comprising:
transmitting a grant scheduling a first higher priority channel that has a higher priority than each channel of a plurality of lower priority channels scheduled for a user equipment (UE);
dropping a first lower priority channel of the plurality of lower priority channels that at least partially overlaps in time with the first higher priority channel based at least in part on the grant being transmitted prior to a multiplexing deadline for the plurality of lower priority channels; and
transmitting or receiving a first transmission using the first higher priority channel and a second transmission using a second lower priority channel of the plurality of lower priority channels based at least in part on the dropping.

20. The method of claim 19, further comprising:
determining the multiplexing deadline relative to a beginning of the first lower priority channel of the plurality of lower priority channels.

21. The method of claim 19, further comprising:
determining the multiplexing deadline based at least in part on whether the grant schedules the first higher priority channel for uplink transmission or downlink transmission.

22. The method of claim 19, further comprising:
determining the multiplexing deadline based at least in part on one or more processing timelines of the plurality of lower priority channels, one or more subcarrier spacings of the plurality of lower priority channels, a timing capability of the UE, or any combination thereof.

23. The method of claim 19, wherein:
multiplexing, based at least in part on the dropping, content of a remaining subset of the plurality of lower priority channels that at least partially overlap in time with one another, wherein the second transmission comprises the multiplexed content.

24. The method of claim 23, further comprising:
transmitting or receiving a third transmission using a third lower priority channel of the plurality of lower priority channels that does not overlap with any other lower priority channel of the plurality of lower priority channels, wherein the third transmission comprises non-multiplexed content.

25. The method of claim 19, wherein the dropping comprises:

dropping the first lower priority channel based at least in part on the grant being transmitted at least a threshold number of symbol periods prior to the multiplexing deadline.

26. The method of claim 19, further comprising:
dropping a second lower priority channel of the plurality of lower priority channels that at least partially overlaps in time with the first higher priority channel.

27. The method of claim 19, further comprising:
determining that a control channel carrying the grant or a shared data channel carrying the grant ends prior to the multiplexing deadline.

28. The method of claim 19, wherein transmitting or receiving the first transmission and the second transmission comprises:
transmitting or receiving each of the first transmission and the second transmission using a single component carrier.

29. An apparatus for wireless communications by a user equipment (UE), comprising:
a processor,
memory in electronic communication with the processor; and
instructions stored in the memory and executable by the processor to cause the apparatus to:
receive a grant scheduling a first higher priority channel that has a higher priority than each channel of a plurality of lower priority channels scheduled for the UE;
drop a first lower priority channel of the plurality of lower priority channels that at least partially overlaps in time with the first higher priority channel based at least in part on determining that the grant is received prior to a multiplexing deadline for the plurality of lower priority channels; and
transmit or receiving a first transmission using the first higher priority channel and a second transmission using a second lower priority channel of the plurality of lower priority channels based at least in part on the dropping.

30. An apparatus for wireless communications by a base station, comprising:
a processor,
memory in electronic communication with the processor; and
instructions stored in the memory and executable by the processor to cause the apparatus to:
transmit a grant scheduling a first higher priority channel that has a higher priority than each channel of a plurality of lower priority channels scheduled for a user equipment (UE);
drop a first lower priority channel of the plurality of lower priority channels that at least partially overlaps in time with the first higher priority channel based at least in part on the grant being transmitted prior to a multiplexing deadline for the plurality of lower priority channels; and
transmit or receiving a first transmission using the first higher priority channel and a second transmission using a second lower priority channel of the plurality of lower priority channels based at least in part on the dropping.

* * * * *